United States Patent
Tu et al.

(10) Patent No.: US 12,524,296 B1
(45) Date of Patent: Jan. 13, 2026

(54) ARTIFICIAL-INTELLIGENCE-BASED ERROR RESOLUTION IN INTEGRATION PROCESSES

(71) Applicant: Boomi, LP, Conshohocken, PA (US)

(72) Inventors: Ching-Han Tu, San Diego, CA (US); Brad Detlefsen, West Chester, PA (US); Aditi Paul, Jersey City, NJ (US)

(73) Assignee: Boomi, LP, Conshohocken, PA (US)

( * ) Notice: Subject to any disclaimer, the term of this patent is extended or adjusted under 35 U.S.C. 154(b) by 48 days.

(21) Appl. No.: 18/770,430

(22) Filed: Jul. 11, 2024

(51) Int. Cl.
*G06F 11/00* (2006.01)
*G06F 11/07* (2006.01)

(52) U.S. Cl.
CPC ................ *G06F 11/0793* (2013.01)

(58) Field of Classification Search
CPC .................................. G06F 11/0793
See application file for complete search history.

(56) References Cited

U.S. PATENT DOCUMENTS

| | | | |
|---|---|---|---|
| 11,140,029 B1* | 10/2021 | Singhal | H04L 41/082 |
| 2017/0083377 A1* | 3/2017 | Muthuvaradharajan | G06F 11/142 |
| 2019/0007263 A1* | 1/2019 | Lahiri | G06F 11/2257 |
| 2019/0377622 A1* | 12/2019 | Kurian | G06F 11/0775 |
| 2019/0377623 A1* | 12/2019 | Ramachandran | G06F 11/0775 |
| 2024/0202065 A1* | 6/2024 | Sridhar | G06F 11/0709 |
| 2025/0307050 A1* | 10/2025 | Patil | G06F 11/0766 |

* cited by examiner

*Primary Examiner* — Joshua P Lottich
(74) *Attorney, Agent, or Firm* — Procopio, Cory, Hargreaves & Savitch LLP

(57) ABSTRACT

Conventional troubleshooting for integration processes in an integration platform is inefficient and requires significant expertise. Accordingly, an error resolution model is disclosed. The error resolution model may be operated to predict an error resolution, based on the current design (e.g., lineage) of an integration process, during construction of that integration process (e.g., on a virtual canvas). A generative language model may also be used to produce dialogs for the error resolutions. This enables the efficient troubleshooting and resolution of errors in an integration process, prior to that integration process being deployed and executed, and without requiring significant expertise.

20 Claims, 16 Drawing Sheets

ARTIFICIAL-INTELLIGENCE-BASED ERROR RESOLUTION IN INTEGRATION PROCESSES

BACKGROUND

Field of the Invention

The embodiments described herein are generally directed to artificial intelligence (AI), and, more particularly, to the use of artificial intelligence to assist in the construction of integration processes by automatically and preemptively identifying resolutions to errors during construction of the integration processes.

Description of the Related Art

Integration platform as a service (iPaaS) enables the integration of applications and data. The iPaaS platform provided by Boomi® of Conshohocken, Pennsylvania, enables users to construct integration processes from pre-built steps, represented by "shapes," which each has a set of configuration properties. Each step dictates how an integration process retrieves data, manipulates data, routes data, sends data, and/or the like. These steps can be connected together in endless combinations to build simple to very complex integration processes.

Recently, there has been a major push to simplify business processes. In particular, it is advantageous when workers can perform daily tasks without requiring special skills or training. This simplifies onboarding and empowers workers to be as efficient and productive as possible.

However, the technical knowledge required to construct integration processes is a barrier to automating the construction process. State-of-the-art systems lack the capability to proactively identify and resolve potential issues in the design of an integration process. Thus, when constructing an integration process, novice users often have to go through multiple iterations of deployment, error detection (i.e., debugging), and error resolution, before achieving a successful, error-free implementation. This results in delays, increased costs, and other inefficiencies. Currently, there is no tool for preemptively resolving errors before they become engrained in the code, let alone, in a low-code or no-code integration development environment.

SUMMARY

Accordingly, systems, methods, and non-transitory computer-readable media are disclosed for AI-based error resolution during construction of integration processes.

In an embodiment,

In an embodiment, a method comprises using at least one hardware processor to: during a building phase, collect historical integration data from a plurality of integration platforms managed through an integration platform as a service (iPaaS) platform, wherein the historical integration data comprise, for each of a plurality of integration processes, a development history of that integration process including at least one failed configuration of that integration process and at least one successful configuration of that integration process, and wherein each of the at least one failed configuration and the at least one successful configuration of each of the plurality of integration processes comprises at least one lineage including a sequence of steps, generate a dataset comprising a representation of the lineage of the at least one failed configuration for each of the plurality of integration processes, wherein each of the representations of the lineages is associated with an error resolution comprising a transformation between the at least one failed configuration and the at least one successful configuration for a respective one of the plurality of integration processes, and based on the dataset, build an error resolution model that receives a representation of a lineage as an input and produces a predicted error resolution as an output; and during an operation phase, generate a graphical user interface comprising one or more inputs for constructing an integration process, receive a lineage including a sequence of steps from a user via the graphical user interface, and in response to a trigger, apply the error resolution model to the received lineage to produce the predicted error resolution for the received lineage.

The predicted error resolution may comprise one or more structural changes to the received lineage. The one or more structural changes may comprise at least one of adding a new step to the sequence of steps in the received lineage, deleting an existing step from the sequence of steps in the received lineage, substituting an existing step in the sequence of steps in the received lineage with a new step, or transposing two existing steps in the sequence of steps in the received lineage.

Generating the dataset may comprise flattening each of the plurality of integration processes, comprising multiple paths through the integration process, in the historical integration data, into a plurality of lineages that each consists of a single path through the integration process. Generating the dataset may further comprise, for each of the plurality of integration processes that comprises multiple paths, including a representation of each of the plurality of lineages of the at least one failed configuration that consists of a single path through the integration process in the dataset. Generating the dataset may further comprise, for each of at least a subset of the plurality of integration processes, including a representation of each of one or more lineages of the at least one failed configuration that consist of a sub-path through the integration process in the dataset.

Each of the representations of the lineages may comprise a feature vector that includes an entry for each step in the lineage and is annotated with the error resolution. The trigger may be a user operation.

The graphical user interface may comprise a virtual canvas on which shapes, representing steps, are dragged and dropped to construct the integration process. The method may further comprise using the at least one hardware processor to display at least one visual representation of the error resolution within the graphical user interface. The at least one visual representation of the error resolution may comprise, for each of one or more changes, a dialog that comprises a visual indication of the change, relative to the shapes on the virtual canvas, a first input for applying the change, and a second input for dismissing the change. When the change is to add a new step to the sequence of steps in the received lineage, the visual indication of the change may comprise a shape representing the new step, and a marker of a position at which to add the new step. When the change is to delete an existing step from the sequence of steps in the received lineage, the visual indication of the change may comprise a strikethrough of the shape that represents the existing step. When the change is to substitute an existing step in the sequence of steps in the received lineage with a new step, the visual indication of the change may comprise a new shape representing the new step, and a connection between the new shape and the shape that represents the existing step. When the change is to transpose a first existing step and a second existing step in the sequence of steps in the received lineage, the visual indication of the change may comprise at least one arrow between the shapes representing the first and second existing steps.

Each of the plurality of integration platforms may be managed by a different organizational account than one or more other ones of the plurality of integration platforms.

The method may further comprise using the at least one hardware processor to, after the building phase and prior to the operation phase, deploy the error prediction model as a microservice within the iPaaS platform.

The method may further comprise using the at least one hardware processor to, in response to the trigger, further: generate a prompt using the error resolution; input the prompt to a generative language model to produce an output; and display the output in the graphical user interface.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for AI-based error resolution during construction of integration processes. Embodiments are intended to increase developer confidence in the construction process and reduce the learning curve in the management of an integration platform in multiple implementation scenarios, by offering contextual assistance through the preemptive resolution of errors during the construction process in a low-code integration environment. In addition, embodiments may minimize users' reliance on subject-matter experts for business applications, via recommendations provided by artificial intelligence that has been trained on data from other users and implementations of integration processes on an iPaaS platform.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
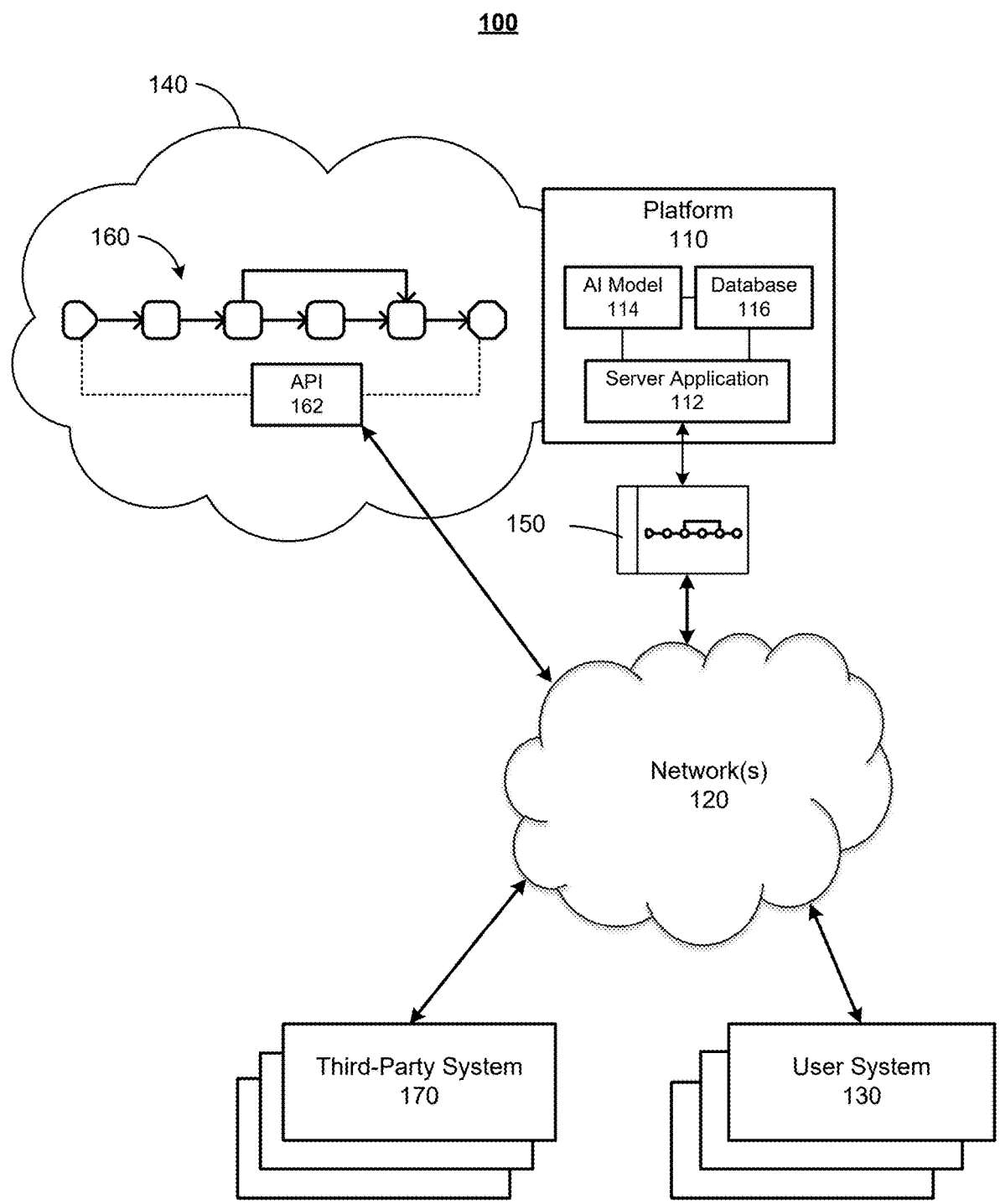
FIG. 1 illustrates an example infrastructure, in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed.

Platform 110 may be communicatively connected to one or more networks 120. Network(s) 120 enable communication between platform 110 and user system(s) 130. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to a plurality of user systems 130 through a single set of network(s) 120, it should be understood that platform 110 may be connected to different user systems 130 via different sets of one or more networks. For example, platform 110 may be connected to a subset of user systems 130 via the Internet, but may be connected to another subset of user systems 130 via an intranet.

While only a few user systems 130 are illustrated, it should be understood that platform 110 may be communicatively connected to any number of user system(s) 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer that has a user account for accessing server application 112 on platform 110. It should be understood that the integration developer may be anywhere from a novice, with little to no prior experience in integration development, to an expert, with many years of experience in integration development.

When platform 110 is an iPaaS platform, each user account may be associated with an overarching organizational account for managing an integration platform on the iPaaS platform.

Server application 112 may manage an integration environment 140. In particular, server application 112 may provide a user interface 150 and backend functionality, including one or more of the processes disclosed herein, to enable users, via user systems 130, to construct, develop, modify, save, delete, test, deploy, un-deploy, and/or otherwise manage integration processes 160 within integration environment 140.

The user of a user system 130 may authenticate with platform 110 using standard authentication means, to access server application 112 in accordance with permissions or roles of the associated user account. The user may then interact with server application 112 to manage one or more integration processes 160, for example, within a larger integration platform within integration environment 140. It should be understood that multiple users, on multiple user systems 130, may manage the same integration process(es) 160 and/or different integration processes 160 in this manner, according to the permissions or roles of their associated user accounts.

Although only a single integration process 160 is illustrated, it should be understood that, in reality, integration environment 140 may comprise any number of integration processes 160. In an embodiment, integration environment 140 supports integration platform as a service (iPaaS). In this case, integration environment 140 may comprise one or a plurality of integration platforms that each comprises one or more integration processes 160. Each integration platform may be associated with an organization, which may be associated with one or more user accounts by which respective user(s) manage the organization's integration platform, including the various integration process(es) 160.

An integration process 160 may represent a transaction involving the integration of data between two or more systems, and may comprise a series of elements that specify logic and transformation requirements for the data to be integrated. Each element, which may also be referred to herein as a "step" and have a visual representation referred to herein as a "shape," may transform, route, and/or otherwise manipulate data to attain an end result from input data. For example, a basic integration process 160 may receive data from one or more data sources (e.g., via an application programming interface 162 of the integration process 160), manipulate the received data in a specified manner (e.g., including analyzing, normalizing, altering, updated, enhancing, and/or augmenting the received data), and send the manipulated data to one or more specified destinations (e.g., via an application programming interface of each destination). An integration process 160 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

Of particular relevance to the present disclosure, the backend functionality of server application 112 may include a process for constructing an integration process 160 within one or more screens of a graphical user interface 150. Embodiments of functionality, in server application 112, that enables the construction of integration processes 160, are disclosed, for example, in U.S. Pat. No. 8,533,661, issued on Sep. 10, 2013, and in U.S. Pat. No. 11,886,965, issued on Jan. 30, 2024, which are both hereby incorporated herein by reference as if set forth in full. In addition, server application 112 may comprise functionality to detect errors during the construction of integration process 160. An example of functionality for detecting errors, using artificial intelligence, is disclosed in U.S. patent application Ser. No. 18/438,244 ("the error prediction application"), filed on Feb. 9, 2024, which is hereby incorporated herein by reference as if set forth in full. In an embodiment, an AI model 114 is used to preemptively resolve those detected errors during the construction of integration process 160. The user may construct, configure, and/or finalize integration process 160 within graphical user interface 150, as facilitated by the error resolution of AI model 114, and then deploy the final, error-free integration process 160 to integration environment 140. Platform 110 may also manage a database 116, which may store data used by server application 112 and/or AI model 114.

Each integration process 160, when deployed, may be communicatively coupled to network(s) 120. For example, each integration process 160 may comprise an application programming interface (API) 162 that enables clients to access integration process 160 via network(s) 120. A client may push data to integration process 160 through application programming interface 162, and/or pull data from integration process 160 through application programming interface 162.

One or more third-party systems 170 may be communicatively connected to network(s) 120, such that each third-party system 170 may communicate with an integration process 160 in integration environment 140 via application programming interface 162. Third-party system 170 may host and/or execute a software application that pushes data to integration process 160 and/or pulls data from integration process 160, via application programming interface 162. Additionally or alternatively, an integration process 160 may push data to a software application on third-party system 170 and/or pull data from a software application on third-party system 170, via an application programming interface of the third-party system 170. Thus, third-party system 170 may be a client or consumer of one or more integration processes 160, a data source for one or more integration processes 160, and/or the like. As examples, the software application on third-party system 170 may comprise, without limitation, enterprise resource planning (ERP) software, customer relationship management (CRM) software, accounting software, and/or the like.

2. Example Processing System

Figure 2:
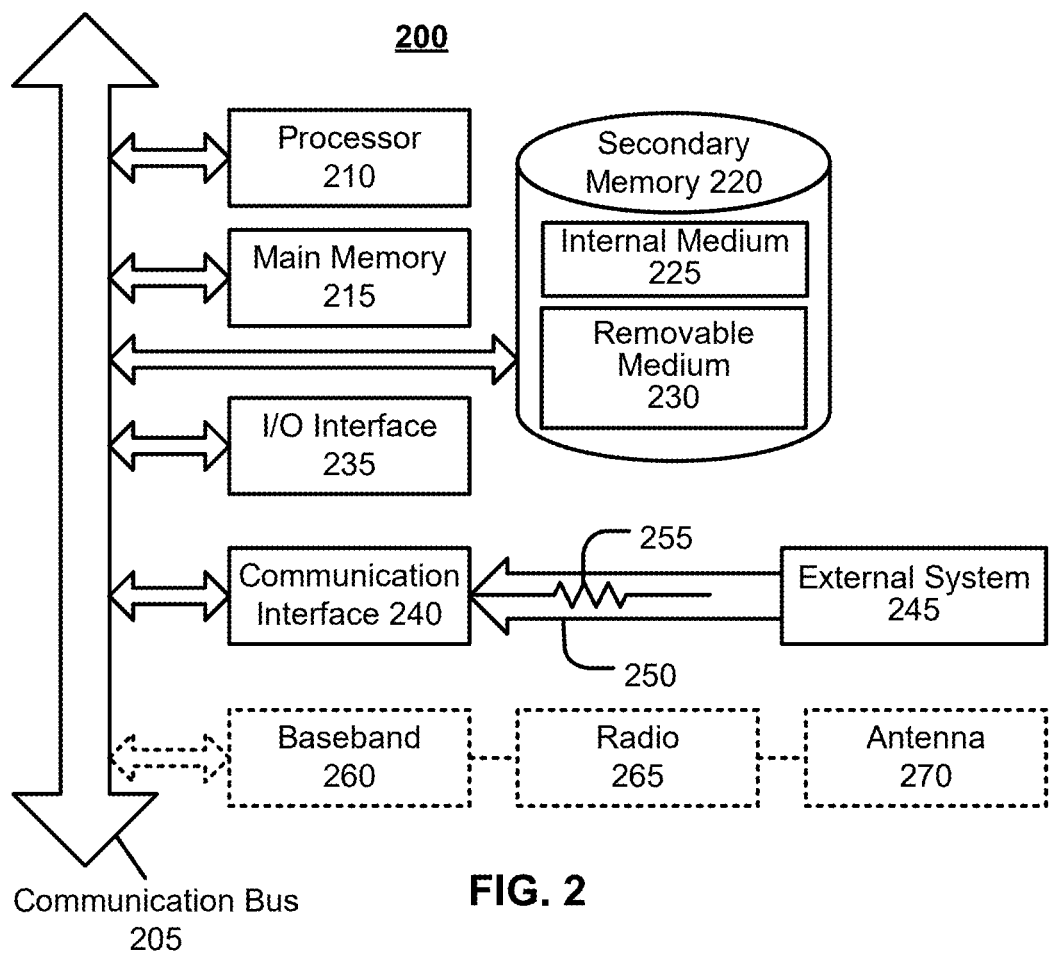
FIG. 2 illustrates an example processing system, by which one or more of the processes described herein may be executed, according to an embodiment.

FIG. 2 illustrates an example processing system 200, by which one or more of the processes described herein may be executed, according to an embodiment. For example, system 200 may be used to store and/or execute server application 112, and/or may represent components of platform 110, user system(s) 130, third-party system(s) 170, and/or other processing devices described herein. System 200 can be any processor-enabled device (e.g., server, personal computer, etc.) that is capable of wired or wireless data communication. It should be understood that a particular implementation of system 200 may omit one or more of the illustrated components and/or include one or more non-illustrated components. Other processing systems and/or architectures may also be used, as will be clear to those skilled in the art.

System 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 may comprise main memory 215. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 are read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

System 200 may comprise an input/output (I/O) interface 235. I/O interface 235 provides an interface between one or more components of system 200 and one or more input and/or output devices. Examples of input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 200 may comprise a communication interface 240. Communication interface 240 allows software to be transferred between system 200 and external devices, networks, or other information sources. For example, computer-executable code and/or data may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Software, which may comprise computer-executable code, is stored in main memory 215 and/or secondary memory 220. Software can also be received from an external system 245 via communication interface 240 and stored in main memory 215 and/or secondary memory 220. The computer-executable code, when executed, may enable system 200 to perform one or more of the disclosed processes.

In an embodiment that is implemented using software, the software may be stored on a computer-readable medium and initially loaded into system 200 by way of removable medium 230, I/O interface 235, or communication interface 240. In such an embodiment, the software is loaded into system 200 in the form of electrical communication signals 255. The software, when executed by processor 210, may cause processor 210 to perform one or more of the disclosed processes.

System 200 may optionally comprise wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

Baseband system 260 is communicatively coupled with processor(s) 210, which have access to memory 215 and 220. Thus, software can be received from baseband processor 260 and stored in main memory 210 or in secondary memory 220, or executed upon receipt. Such software, when executed, can enable system 200 to perform one or more of the disclosed processes.

3. Introduction

The value of an integration platform hinges on its ability to flawlessly transfer and transform data between complex systems. However, as with any complex system, occasional errors are inevitable. These errors can result from a myriad of issues, including, without limitation, coding issues, data transformation or mapping issues, network and connectivity issues, API issues, user errors, and/or the like.

Conventional construction processes for integration processes 160 happen in three steps. First, the user must construct an integration process 160. Second, the user must run the constructed integration process 160 to detect any errors. Third, the user must manually resolve the error(s) via trial and error. This three-step process relies heavily on human skills, including insight, research, creativity, and connecting diverse information to identify and resolve the underlying issues.

This conventional three-step process is inefficient for at least two reasons. Firstly, errors are only detected after deploying and operating integration process 160. This delay in detecting errors results in significant delays in resolving the errors and incurs substantial costs in time and resource allocations. Secondly, the trial-and-error phase for resolving the errors depends heavily on the user's understanding of integration, platform 110, and the available data. Without significant knowledge, experience, and/or data, it will be difficult and potentially infeasible for the user to resolve the errors.

Accordingly, disclosed embodiments of server application 112 analyze the design of an integration process 160, using AI model 114, during the construction of integration process 160 via user interface 150. The design of integration process 160 may be analyzed by AI model 114 in response to a user operation, in real time in the background as integration process 160 is constructed, and/or in response to another trigger. AI model 114 may comprise an error resolution model, trained on data from historical integration data, which may comprise a massive repository of previously executed integration processes 160, and optionally, a generative language model to summarize error resolutions, output by the error resolution model, in natural language (i.e., the language that would be expected during a conversation between humans), visual dialogs, and/or other easy-to-understand formats. Thus, when AI model 114 identifies a potential error resolution, the user may be notified about the potential error resolution via user interface 150.

Disclosed embodiments provide automated error resolution for low-code integration environments, while increasing efficiency and build quality in the development of integration processes 160. In particular, embodiments may proactively identify error-prone areas in the design of an integration process 160, and propose structural changes to those error-prone areas, during construction and before deployment, to reduce the likelihood of errors, optimize the overall construction process, and reduce the need for extensive post-deployment troubleshooting. Such embodiments also provide novice users with the ability to understand potential error resolutions, so that the users can feel confident about any adopted error resolutions before compilation and execution of integration process 160. The result is an increase in the reliability of users' integration platforms, a reduction in the number of cases that must be managed by customer support, a smoother user experience, and greater product satisfaction and trust.

As used herein, the term "error" should be understood to include any execution result that may impact integration process 160. In a preferred embodiment, an execution result comprises any errors and/or warnings that are produced at compile-time and/or runtime of integration process 160. Thus, it should be understood that the term "error," as used herein, may include both an error event that prevents integration process 160 from continuing to function and a warning event that indicates a problem from which integration process 160 is able to at least partially recover.

As used herein, the term "error resolution" refers to any action that prevents or mitigates such an error. Such an action may be a structural and/or non-structural change to integration process 160. Examples of structural changes include, without limitation, adding a new step to integration process 160, deleting an existing step from integration process 160, substituting an existing step with a new step within integration process 160, transposing two steps (i.e., switching the positions of the two steps) within integration process 160, and/or the like. Examples of non-structural changes include, without limitation, a change to a configurable parameter of a step within integration process 160, a change to a configurable parameter of a connection between two steps within integration process 160, a change to a configurable parameter of integration process 160 as a whole, and/or the like.

4. Example Data Flow

Figure 3:
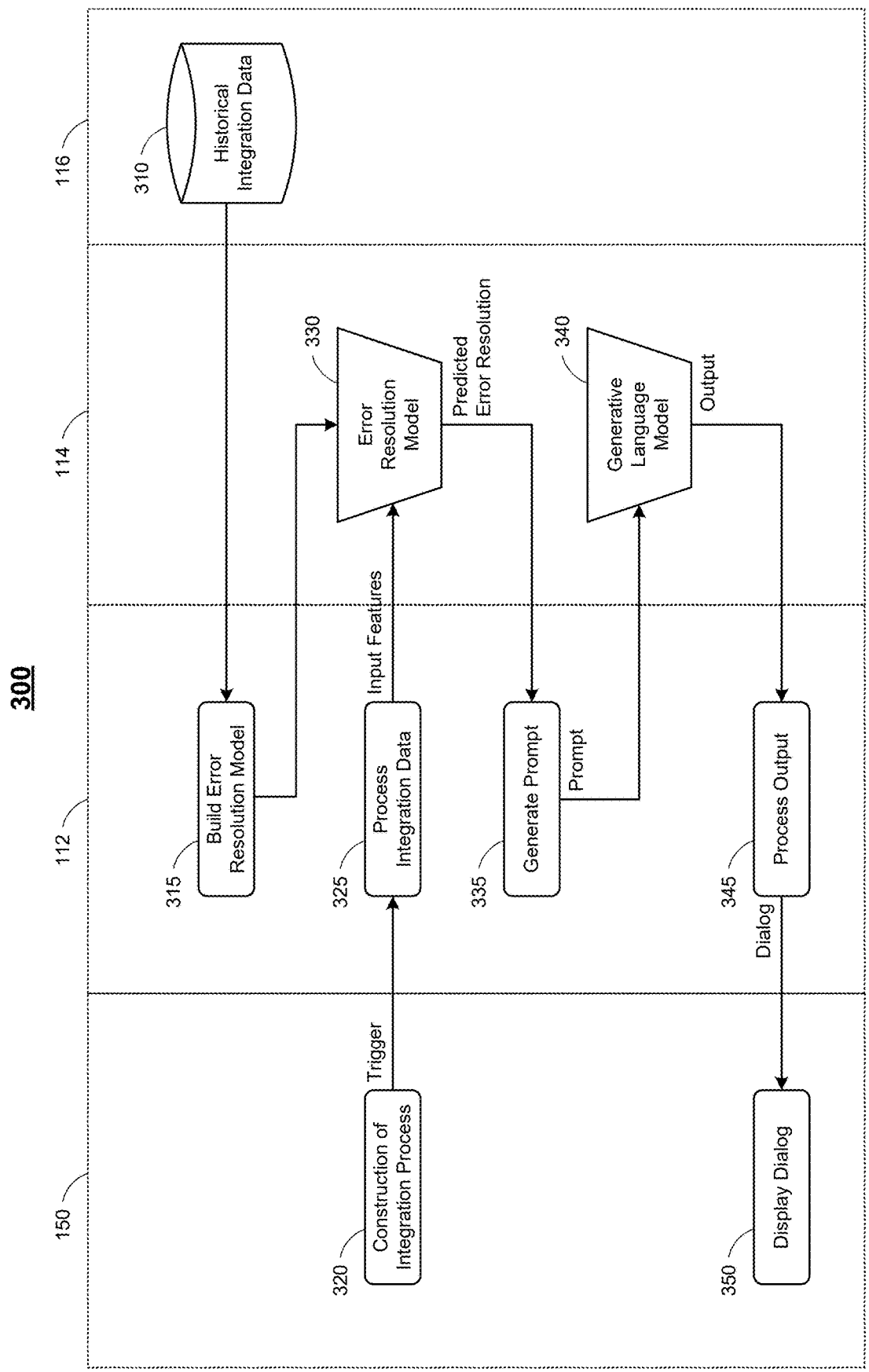
FIG. 3 illustrates an example data flow for AI-based error resolution during construction of an integration process, according to an embodiment.

FIG. 3 illustrates an example data flow 300 for AI-based error resolution during construction of an integration process 160, according to an embodiment. In data flow 300, user interface 150 may implement modules 320 and 350, server application 112 may implement modules 315, 325, 335, and 345, AI model 114 may comprise error resolution model 330 and, optionally, generative language model 340, and database 116 may store historical integration data 310. Modules 315, 320, 325, 335, 345, and 350 are preferably implemented as software modules, but could also be implemented as hardware modules or as modules comprising a combination of hardware and software.

Historical integration data 310 may comprise representations of previously constructed and executed integration processes 160, as well as the execution results, including any errors, associated with those integration processes 160. In an embodiment, historical integration data 310 comprise a development history for each of a plurality of integration processes 160. For example, the development history for an integration process 160 may comprise at least one failed configuration of the integration process 160, and at least one successful configuration of the integration process 160. As discussed elsewhere herein, each configuration, whether failed or successful, may comprise a lineage (e.g., sequence of steps) of integration process 160. The development history may also comprise the difference between the failed configuration and the successful configuration, or this difference may be otherwise derived from the development history by comparing the failed configuration to the successful configuration. It should be understood that a failed configuration is one for which the associated execution result of integration process 160 includes at least one error, whereas a successful configuration is one for which the associated execution result of integration process 160 includes no errors. The difference, between the failed configuration and the successful configuration, may be used to derive a transformation comprising a set of one or more changes required to convert the failed configuration into the successful configuration. In other words, the transformation represents an error resolution that is assumed to have successfully resolved any errors present in the failed configuration. This error resolution may comprise a structural change (i.e., to the lineage of integration process 160), such as adding a new step to integration process 160, deleting an existing step from integration process 160, substituting an existing step with a new step in integration process 160, transposing the order of two existing steps in integration process 160, and/or the like. Alternatively or additionally, this error resolution may comprise a non-structural change, such as a change in one or more parameters of a step in integration process 160, a change in one or more parameters of a connection between steps in integration process 160, a change in one or more parameters of integration process 160 as a whole, and/or the like.

Historical integration data 310 may be collected from a plurality of integration platforms managed and executed by an iPaaS platform, such as the Boomi® iPaaS platform. The iPaaS platform may support a plurality of integration platforms, each managed by a different organizational account that is associated with one or more user accounts. In this case, historical integration data 310 may represent a massive repository of previously executed integration processes 160 that is very diverse in terms of structures, configurations, applications, inputs and outputs, and the like, and potentially crowd-sourced from a diverse group of organizations.

As an example, whenever an integration process 160 is executed in integration environment 140 on platform 110, which may be an iPaaS platform, server application 112 may store an execution result representing the result of the execution of that integration process 160. Each execution result may comprise an indication of whether the execution of that integration process 160 failed or was successful and/or a timestamp representing each of a start time and/or end time (e.g., fail time in the event of failure, or completion time in the event of success) of the execution of that integration process 160. In addition, whenever an integration process 160 is modified within integration environment 140, server application 112 may store an indication or representation of the modification and/or may store representations of the integration process 160 before and after the modification, along with a timestamp representing the time of the modification. Periodically or in response to a user operation, one or more development histories for each of a plurality of integration processes 160 may be generated by, for each of the plurality of integration processes 160, finding a sequence of a failed execution, a modification, and a successful execution, and pairing the failed configuration that produced the failed execution with the successful configuration that produced the successful execution. These pairs of failed and successful configurations may be used to generate a training dataset, as discussed elsewhere herein.

Module 315, which will be described in greater detail elsewhere herein, may utilize historical integration data 310 to build (e.g., train) an error resolution model 330 of AI model 114. Error resolution model 330 is built to accept integration data for an integration process 160 as input, and output a predicted error resolution to integration process 160 that resolves detected errors, if any, associated with that integration process 160. It should be understood that the integration data that are input to error resolution model 330 may utilize the same input schema as the integration data that are used to build error resolution model 330. Notably, the massive and diverse set of previously executed integration processes 160, in historical integration data 310, enables error resolution model 330 to recommend more intelligent and accurate resolutions than would be possible using conventional tools.

At some subsequent time, using module 320, a user may begin constructing an integration process 160 within user interface 150. For example, user interface 150 may comprise or consist of a graphical user interface that comprises a virtual canvas on which a user may drag and drop and connect shapes, representing steps that perform specific functions within an integration process 160. Thus, the user may intuitively construct an integration process 160 by simply placing shapes on the virtual canvas and connecting those shapes together, to define data flows between the functions represented by those shapes.

Although not specifically illustrated, during construction of integration process 160, the user may utilize an error detection function (e.g., provided by software 112) to detect one or more potential errors within integration process 160. The error prediction application, discussed elsewhere herein, describes an example of an error detection function that utilizes artificial intelligence to predict errors, even before integration process 160 has been compiled or executed. This error detection function may be performed prior to application of error resolution model 330 to detect whether or not integration process 160 contains any potential errors. Then, disclosed embodiments may be utilized to resolve one or more, including potentially all, of the detected errors.

At one or more points in time, during construction of integration process 160 in module 320, error resolution in module 325 may be executed in response to a trigger. In an embodiment, the trigger is a user operation. For instance, the user may select a resolution-recommendation input within user interface 150 that triggers module 325. Alternatively or additionally, module 325 may be triggered in the background (i.e., without user involvement), in real time, in response to an event, such as the detection of an error in integration process 160. For example, the trigger may be the execution of the error detection function to detect errors within integration process 160. In this case, module 325 may be automatically triggered upon the detection of any errors by the error detection function, and not triggered when no errors are detected by the error detection function. It should be understood that, as used herein, the terms "real time" and "real-time" refer to events that occur simultaneously, as well as events that are separated in time due to ordinary latencies in processing, communications, memory access, and/or the like. In any case, module 325 may be triggered, automatically (i.e., without user intervention), semi-automatically (e.g., with user confirmation), and/or manually (e.g., in response to a user operation) according to any of the above examples or in any other suitable manner.

When triggered (e.g., via user interface 150), module 325, which will be described in greater detail elsewhere herein, processes integration data, of the integration process 160 being constructed in module 320, according to an input schema for error resolution model 330, and inputs the processed integration data into error resolution model 330. Module 325 may load error resolution model 330 from database 116. Alternatively, error resolution model 330 may execute as a service that is always available to module 325 (e.g., in a microservices architecture), in which case module 325 may provide the input to error resolution model 330 via an application programming interface (API) of error resolution model 330.

The output of error resolution model 330 may be a predicted error resolution comprising one or more changes for addressing each detected error in integration process 160 or for integration process 160 as a whole. In an embodiment, the predicted error resolution comprises or consists of one or more structural changes, such as an addition, deletion, substitution, and/or transposition, to be made to the integration process 160 being constructed in module 320. Alternatively or additionally, the predicted error resolution may comprise or consist of one or more non-structural changes, such as a change in value to each of one or more parameters of a step, connection, or integration process 160 as a whole. Each change may be associated with a particular component (e.g., step, connection, configurable attribute, etc.) or subset of components of integration process 160 or with integration process 160 as a whole. A change may be represented as a data structure comprising an identifier of the change, an identifier of each of one or more components affected by the change, a new value for a parameter, a description of the change (e.g., in natural language), and/or the like. It should be understood that, in the event that no error is detected by the error detection function, the recommended error resolution, output by error resolution model 330, may be empty or subprocess 325 may be omitted altogether.

Module 335 may receive the error resolution, output by error resolution model 330, and generate a prompt for generative language model 340 using the error resolution. Module 335 may generate the prompt by inserting the error resolution, output by error resolution model 330, into a predefined template. The raw error resolution may be inserted, or the error resolution may be pre-processed before insertion. The predefined template may comprise a pre-conversation and/or post-conversation, which provide context and/or instructions for generative language model 340, and a placeholder into which the error resolution is inserted. The pre-conversation and/or post-conversation may define the role of generative language model 340 (e.g., to summarize the output of error resolution model 330), define an output format for generative language model 340 (e.g., a list structure, a hierarchical structure, a markup-language structure, etc.), and/or the like.

Module 335 may input the generated prompt to generative language model 340 of AI model 114 to produce an output, which may comprise a natural-language expression, a data structure representing a visual dialog to be rendered in user interface 150, and/or the like. Generative language model 340 may comprise or consist of a large language model, such as the Generative Pre-trained Transformer (GPT). GPT-4 is the fourth-generation language prediction model in the GPT-n series, created by OpenAI™ of San Francisco, California. GPT-4 is an autoregressive language model that uses deep learning to produce human-like text. GPT-4 has been pre-trained on a vast amount of text from the open Internet. While GPT-4 is provided as an example, it should be understood that generative language model 340 may be any generative language model, including past and future generations of GPT, as well as other large language models. Alternatively or additionally, generative language model 340 may comprise or consist of a code-completion model that is trained to produce data structures, such as visual dialogs, to be rendered in a graphical user interface. In an embodiment, a pre-trained generative language model is used as a base model that is fine tuned for the specific task of conveying the changes comprised in a predicted error resolution, to produce generative language model 340.

Module 345 may receive the output of generative language model 340 in response to the prompt. The output may comprise or consist of a summary of the error resolution, output by error resolution model 330, expressed in natural language, a data structure representing a dialog to be rendered in user interface 150, and/or the like. In the event that error resolution model 330 did not output any error resolution or output an empty error resolution, the output may be empty or null, or may comprise or consist of an indication (e.g., in natural language) that no error resolutions were identified and/or are required. Alternatively, in the event that error resolution model 330 did not output any error resolution or output an empty error resolution, execution of module 335 may be omitted, such that an indication of no error resolutions is provided directly to module 345 without utilizing generative language model 340. When receiving an output, module 345 may process the output by formatting the output into a visual representation that is output to user interface 150. As an example, the visual representation may comprise one or more dialogs that include the output and potentially one or more inputs for interacting with the dialog.

In an alternative embodiment, module 335 and generative language model 340 may be omitted. In this case, the predicted error resolution, output by error resolution model 330, may be provided directly to module 345 to be processed into the visual representation for display within user interface 150. The visual representation may be generated by applying logic (e.g., comprising a set of one or more rules) to the predicted error resolution. For example, the logic may automatically convert each change in the predicted error resolution into a visual dialog based on a template for each type of change. The templates may comprise an addition template for adding a new step, a deletion template for deleting an existing step, a substitution template for substituting an existing step with a new step, a transposition template for transposing two existing steps, a value template for changing a value of a parameter, and/or the like.

In module 350, user interface 150 may display the visual representation within the graphical user interface. For example, user interface 150 may be updated to display the dialog(s) output by module 345. In an embodiment, each dialog is displayed as a frame overlaid on the virtual canvas that was being used to construct integration process 160 in module 320. Thus, the user is able to see a visual representation of each recommended error resolution in the same screen as the constructed representation of integration process 160. Consequently, the user may easily edit integration process 160, in view of the visually represented error resolution(s), to potentially resolve any errors, for example, by adding a new shape, deleting an existing shape, substituting an existing shape with a new shape, transposing two existing shapes, reconfiguring an existing step (e.g., modifying a parameter of the step), removing a connection between shapes, adding a connection between shapes, replacing a connection between shapes, and/or updating any other aspect of any component of integration process 160. If no error resolution was output by error resolution model 330, the visual representation may comprise a single dialog that indicates (e.g., in natural language) that no error resolution was determinable.

In an embodiment in which user interface 150 comprises a virtual canvas, a visual indication of each suggested change in the error resolution may be displayed in association with the component(s) that are affected by that change. For example, the visual indication of a suggested change may be displayed on the virtual canvas near or in the vicinity of the component(s) affected by that change, visually linked (e.g., by a line or arrow) to the component(s) affected by that change, and/or the like.

In particular, the visual representation of the error resolution may comprise, for each of the change(s) in the error resolution, a dialog that comprises a visual indication of the change, relative to the shapes on the virtual canvas, a first input for applying the change, and/or a second input for dismissing the change. For example, when the change is to add a new step to the sequence of steps in the lineage of integration process 160, the visual indication of the change may comprise the shape that represents the new step, and a marker of a position at which to add the new shape. When the change is to delete an existing step from the sequence of steps in the lineage of integration process 160, the visual indication of the change may comprise a strikethrough (e.g., single strikethrough, double strikethrough, x-shaped strikethrough) of the shape that represents the existing step. When the change is to substitute an existing step in the sequence of steps in the lineage of integration process 160, the visual indication of the change may comprise a new shape that represents the new step, and a connection (e.g., line or arrow) from the new shape to the existing shape that represents the existing step. When the change is to transpose a first existing step and a second existing step in the sequence of steps in the lineage of integration process 160, the visual indication may comprise at least one arrow between the shapes representing the first and second existing steps, such as, for example, a first arrow from the shape representing the first existing step to the shape representing the second existing step and a second arrow from the shape representing the second existing step to the shape representing the first existing shape, indicating transposition of the first and second existing steps. In all cases, user selection of the first input for applying a change may trigger user interface 150 to execute backend functionality to automatically implement the respective change in integration process 160 and update user interface 150 to reflect the change. Conversely, user selection of the second input for dismissing a change may trigger an update to user interface 150 that removes the visual indication of the respective change from user interface 150. It should be understood that, in the event that the error resolution comprises a plurality of changes, the inputs for the visually indicated changes may be independent, such that the application or dismissal of one change does not affect the visual indication of another non-applied and non-dismissed change.

5. Building Phase

Figure 4:
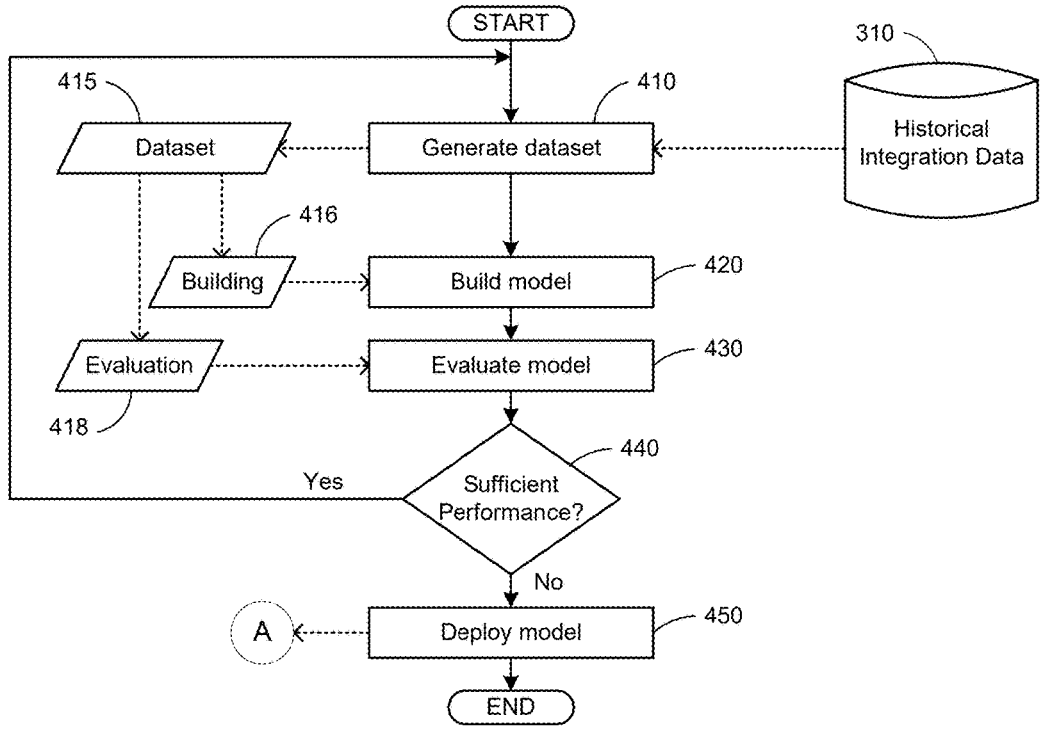
FIG. 4 illustrates a process for building an error resolution model in a building phase, according to an embodiment.

FIG. 4 illustrates a process for building an error resolution model 330, implemented by module 315, in a building phase, according to an embodiment. Module 315 may be implemented in server application 112. While module 315 is illustrated with a certain arrangement and ordering of subprocesses, module 315 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

The input to module 315 may be historical integration data 310. Historical integration data 310 may comprise representations of previously constructed and executed integration processes 160, as well as any execution results associated with those integration processes 160. For example, historical integration data 310 may comprise, for each of a plurality of integration processes 160, the components of that integration process 160, including the steps in that integration process 160 and the configuration of each step in that integration process 160, as well as any errors that have been generated by that integration process 160 during compilation and/or execution. In particular, historical integration data 310 may comprise, for each represented integration process 160, information about the software routine implementing that integration process 160, configurations and settings of that integration process 160, and execution results of that integration process 160. The execution results may include, without limitation, execution data, execution logs, error information (e.g., for any errors and warnings), timing information, and/or the like. It should be understood that there may be many integration processes 160, represented in historical integration data 310, that are not associated with any error.

As mentioned elsewhere herein, in an embodiment, historical integration data 310 comprise a development history for each of a plurality of integration processes 160. For example, the development history for an integration process 160 may comprise a failed configuration of the integration process 160, a successful configuration of the integration process 160, and/or the like. Historical integration data 310 may also comprise the difference between the failed configuration and the successful configuration, or this difference may be derived by comparing the failed configuration to the successful configuration. Each configuration, whether failed or successful, may comprise the lineage (e.g., a full lineage and/or one or more sub-lineages) of the integration process 160 at the time of the execution that either failed or succeeded, the value of each of one or more parameters of the steps, connections, and/or integration process 160 as a whole at the time of the execution that either failed or succeeded, and/or the like.

In subprocess 410, a dataset 415 is generated or otherwise acquired from historical integration data 310. Dataset 415 may comprise representations of the plurality of integration processes 160 represented in historical integration data 310. In particular, dataset 415 may comprise an annotated or labeled plurality of feature vectors, as the representations of integration processes 160. Each feature vector may represent a single integration process 160 from historical integration data 310, and contain the value of one or more features, derived from historical integration data 310. In addition, each feature vector in dataset 415 may be annotated with a target output for the integration process 160 represented by that feature vector. In an embodiment, each feature vector represents a failed configuration of an integration process 160, and each target output represents an error resolution to the failed configuration.

As mentioned elsewhere herein, each integration process 160 will comprise at least one lineage. As used herein, the term "lineage" refers to a sequence of steps that represents a path or sub-path through the integration process 160. An integration process 160 may contain a plurality of paths. In particular, an integration process 160 may comprise a decision step or other type of step that results in the integration process 160 branching into a plurality of paths. It should be understood that an integration process 160 may comprise multiple branches, such that there may be numerous possible paths through the integration process 160. In an embodiment, each lineage consists of the sequence of steps in a single path or single sub-path through the integration process 160.

In an embodiment, each of the plurality of feature vectors in dataset 415 comprises or otherwise represents a single lineage of the represented integration process 160. If an integration process 160 comprises a plurality of lineages (i.e., paths or sub-paths), a separate feature vector may be generated for each lineage in that integration process 160. Thus, for example, if an integration process 160 comprises three lineages, three feature vectors may be generated, annotated, and incorporated into dataset 415. The process of generating feature vectors for each lineage in an integration process 160 may be referred to as "flattening," which will be discussed in greater detail elsewhere herein. The integration data may also be "cleaned" when being converted into feature vectors, which will also be discussed in greater detail elsewhere herein.

In an embodiment, each of the plurality of feature vectors in dataset 415 represents a failed lineage and is annotated with an error resolution that comprises a transformation to the integration process 160, represented by the feature vector, that is known to have converted the integration process 160 from a failed configuration to a successful configuration. For example, as discussed elsewhere herein, historical integration data 310 may comprise a development history of one or more integration processes 160. Subprocess 410 may analyze the development history of each integration process 160 to identify at least one failed configuration and at least one successful configuration, and determine (e.g., compute) the transformation from the failed configuration to the successful configuration that eliminates the difference between the failed configuration and the successful configuration. In an embodiment, when there are a plurality of successful configurations for the same integration process 160, the transformation may be determined using the successful configuration that is associated with the highest performance in the execution results, according to one or more metrics.

The transformation may comprise at least one structural change in the lineage of integration process 160. In other words, each failed configuration and each successful configuration may comprise at least one lineage, including a sequence of steps. The difference between the failed and successful configurations represents the difference between those lineages (e.g., the difference in the sequences of steps), and the transformation represents the change(s) required to eliminate the difference between those lineages. The transformation in a lineage may comprise adding a new step, deleting an existing step, substituting an existing step with a new step, transposing two existing steps, and/or the like. It is inferred that the transformation in the lineage, from the failed configuration to the successful configuration, were responsible for resolving the error(s) that caused the failure of the integration process 160 in the failed configuration, as recorded in the execution results for that integration process 160.

Alternatively or additionally, the transformation may comprise at least one non-structural change to integration process 160. A non-structural change is any change that does not affect the arrangement of steps in the lineage of integration process 160. For example, a non-structural change may comprise changing the value of a parameter of a step in integration process 160, the value of a parameter of a connection between two steps in integration process 160, the value of a parameter of integration process 160 as a whole, and/or the like.

For the development history of each of the plurality of integration processes 160, represented in historical integration data 310, subprocess 410 may generate a feature vector representing the failed configuration for the integration process 160 and annotate this feature vector with an error resolution that represents the computed transformation from the failed configuration to the successful configuration for the integration process 160. In particular, the feature vector may represent at least one lineage of the failed configuration. It should be understood that the error resolution, with which a feature vector is annotated, is the target output for training. In the event that the computed transformation comprises adding a new step, the error resolution may indicate the addition of a new step and identify the new step to be added. In the event that the computed transformation comprises deleting an existing step, the error resolution may indicate the deletion of an existing step and identify the existing step to be removed. In the event that the computed transformation comprises substituting a step, the error resolution may indicate the substitution of a step, identify the existing step to be substituted out, and identify the new step to be substituted in. In the event that the computed transformation comprises transposing two existing steps, the error resolution may indicate the transposition of steps and identify the two existing steps to be transposed (i.e., reversed in order). It should be understood that the error resolution may comprise one change or a plurality of changes. If the lineage, represented by a feature vector, is not associated with any errors in historical integration data 310, the feature vector may be annotated with information that indicates that the configuration of the integration process 160, represented by the lineage, was successful.

Dataset 415 may comprise representations of the lineages in the plurality of integration processes 160 in historical integration data 310. In an embodiment, dataset 415 comprises a representation (e.g., feature vector) of the lineage of at least one failed configuration for each of at least a subset of the plurality of integration processes 160 represented in historical integration data 310. Each of these representations of the lineages may be associated (e.g., annotated) with an error resolution. The error resolution may comprise a transformation from the failed configuration to a successful configuration of the same respective one of the plurality of integration processes 160.

In an additional embodiment, dataset 415 comprises a representation (e.g., feature vector) of the lineage of at least one successful configuration for each of at least a subset of the plurality of integration processes 160 represented in historical integration data 301. Each of these representations of the lineages may be associated (e.g., annotated) with an indication of successful execution.

In summary, subprocess 410 may comprise analyzing historical integration data 310 to identify all error-prone lineages and their development histories, identify the differences between the error-prone lineages and successful lineages of the same integration processes 160, and compute the transformations (e.g., addition, deletion, substitution, transposition, change in parameter values, etc.) required to eliminate those differences. It should be understood that an error-prone lineage may be a lineage of any integration process 160 that is associated with an execution result that includes one or more errors. In addition, a transformation is the set of one or more changes required to convert the failed configuration into the successful configuration (i.e., eliminate the difference between the failed and successful configurations).

Once generated, dataset 415 may be split into one or more subsets, including a building subset 416 and an evaluation subset 418. Evaluation subset 418 could be further split into a validation subset and a testing subset. Each subset comprises or consists of a portion of dataset 415. Typically, building subset 416 will not overlap with evaluation subset 418. The division of dataset 415 into the various subsets may be performed sequentially or according to any other suitable sampling technique. Generally, building subset 416 will be significantly larger than evaluation subset 418.

In subprocess 420, error resolution model 330, which receives a representation of a lineage as an input and produces an error resolution as an output, may be built based on building subset 416. Error resolution model 330 may be a machine-learning model or a logic-based AI model. Error resolution model 330 may comprise any suitable model, including, without limitation, an artificial neural network, such as a deep-learning neural network (DNN), recurrent neural network (RNN), graph neural network (GNN), or the like, a random forest algorithm, a linear regression algorithm, a logistic regression algorithm, a decision tree, a support vector machine (SVM), a Hidden Markov Model (HMM), a naïve Bayes algorithm, a Bayesian Online Change Point Detection (BOCPD) algorithm, a Cumulative Sum Control Chart (CUSUM), a k-Nearest Neighbors (kNN) algorithm, a K-means algorithm, a dimensionality reduction algorithm, a gradient-boosting algorithm, a Markov chain, a compact prediction tree (CPT), and/or the like.

Regardless of the particular model that is used, conceptually, error resolution model 330 may match an input lineage to lineages in historical integration data 310 to determine lineages in historical integration data 310 that are identical or similar to the input lineage (e.g., via direct matching or learned inference), and output a predicted error resolution associated with those matching lineages in historical integration data 310. For example, an input lineage of A-B-C may essentially be matched to lineages of A-B-C in historical integration data 310, and error resolution model 330 may return the error resolution for the matched lineages in historical integration data 310. Error resolution model 330 may process (e.g., be trained on) historical integration data 310 to recognize patterns, representing commonalities and recurring themes, within the integration data (e.g., structures) of failed and/or successful integration processes 160, and output (e.g., infer) error resolutions that are effective for those patterns.

In an embodiment in which error resolution model 330 is a machine-learning model, subprocess 420 may comprise training error resolution model 330, using supervised learning, to infer an error resolution, given a feature vector that represents a lineage as input. In particular, error resolution model 330 may be trained by minimizing a loss function over a plurality of training iterations. In each training iteration, one feature vector from building subset 416 may be input to error resolution model 330 to output a predicted error resolution, the loss function may calculate an error between the predicted error resolution and the error resolution with which the feature vector is annotated, and one or more weights in error resolution model 330 may be adjusted, according to a suitable technique (e.g., gradient descent), to reduce the error of the loss function. A training iteration may be performed for each of the annotated plurality of feature vectors in building subset 416.

In an alternative embodiment in which error resolution model 330 is a machine-learning model, error resolution model 330 may be trained using unsupervised learning. In this case, lineages, represented as feature vectors in building subset 416, may be clustered using any suitable clustering technique. Each feature vector may still be annotated with an error resolution, such that the error resolution may be retrieved for any given feature vector or cluster of feature vectors during operation of error resolution model 330.

In subprocess 430, error resolution model 330, built in subprocess 420, may be evaluated. The evaluation may comprise validating and/or testing error resolution model 330 using evaluation subset 418 of dataset 415. The result of subprocess 430 may be a performance measure for error resolution model 330, such as an accuracy of error resolution model 330. Any suitable evaluation method and performance measure may be used.

In subprocess 440, it is determined whether or not error resolution model 330, built in subprocess 420, is acceptable based on the evaluation performed in subprocess 430. For example, the performance measure from subprocess 430 may be compared to a threshold or one or more other criteria. If the performance measure satisfies the criteria (e.g., is greater than or equal to the threshold), error resolution model 330 may be determined to be acceptable (i.e., "Yes" in subprocess 440). Conversely, if the performance measure does not satisfy the criteria (e.g., is less than the threshold), error resolution model 330 may be determined to be unacceptable (i.e., "No" in subprocess 440). When error resolution model 330 is determined to be acceptable (i.e., "Yes" in subprocess 440), module 315 may proceed to subprocess 450. Otherwise, when error resolution model 330 is determined to be unacceptable (i.e., "No" in subprocess 440), module 315 may return to subprocess 410 to rebuild or modify error resolution model 330 (e.g., using a new or modified dataset 415).

In subprocess 450, error resolution model 330 may be deployed. In particular, after the building phase and prior to the operation phase, error resolution model 330 may be deployed by moving error resolution model 330 from a development environment to a production environment of platform 110. For example, error resolution model 330 may be deployed as a microservice that is available at an address on platform 110 (e.g., an iPaaS platform) that is accessible to server application 112. Alternatively, error resolution model 330 may be comprised in server application 112.

Once deployed, error resolution model 330 may be used, in an operation phase, to dynamically generate suggested error resolutions for error-prone integration processes 160 under construction. The suggested error resolutions may comprise specific, easily-implementable changes that are tailored to address the errors in integration processes 160, prior to deployment of integration processes 160. Advantageously, this reduces the likelihood of the occurrence of errors after integration processes 160 have been deployed.

6. Operation Phase

Figure 5:
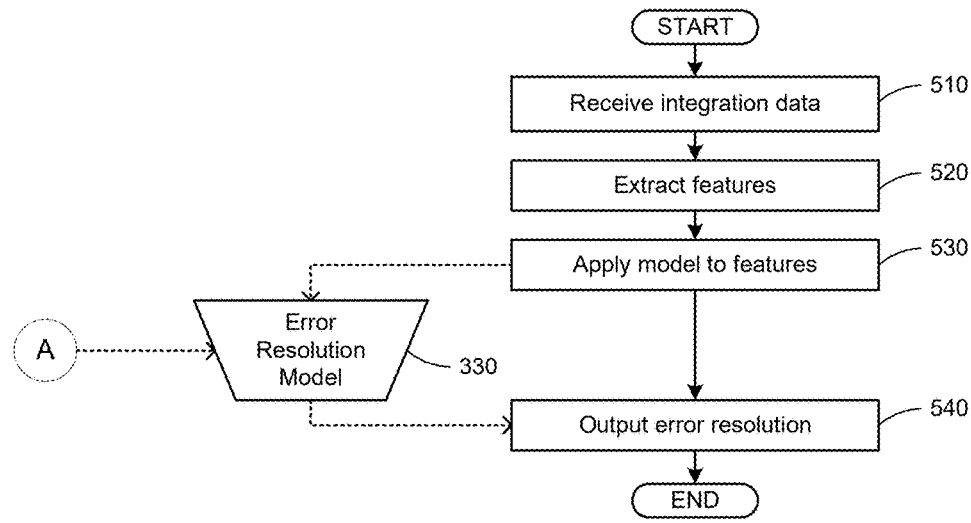
FIG. 5 illustrates a process for operating an error resolution model in an operation phase, according to an embodiment.

FIG. 5 illustrates a process for operating error resolution model 330, implemented by module 325, in an operation phase, according to an embodiment. Module 325 may be implemented in server application 112. While module 325 is illustrated with a certain arrangement and ordering of subprocesses, module 325 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

Initially, in subprocess 510, integration data are received. The integration data may represent an integration process 160 under construction in module 320. In particular, when module 325 is triggered, the integration data, representing the integration process 160 under construction, may be provided to module 325. This integration data may comprise the components of integration process 160, including the steps in integration process 160 and the configuration of each step in integration process 160. In particular, the integration data may comprise, for the integration process 160 under construction, the configuration of the integration process 160, and/or information about the software routine implementing the integration process 160.

In subprocess 520, features may be extracted from the integration data received in subprocess 510. In particular, at least one feature vector may be generated from the integration data in the same or similar manner as feature vectors were extracted from historical integration data 310 in subprocess 410 of module 315, and according to the same input schema of error resolution model 330. Consequently, the feature vector may represent a lineage of the integration process 160 under construction. In an embodiment, a separate feature vector may be generated for each lineage (e.g., path and/or sub-path) in the integration process 160 under construction. When processing the integration data into their corresponding feature vectors, subprocess 520 may utilize the same flattening and cleaning as in subprocess 410. However, it should be understood that the resulting feature vector will not be annotated, in contrast to the annotated feature vectors in dataset 415.

In subprocess 530, error resolution model 330, which was trained in subprocess 420 of module 315 and deployed by subprocess 450 of module 315, may be applied to the features, extracted in subprocess 520. In particular, each feature vector, generated in subprocess 520, may be input to error resolution model 330. If there are multiple feature vectors (i.e., representing multiple lineages), each feature vector may be input to error resolution model 330, individually in serial or in parallel, or collectively as a batch. When applied to a feature vector, error resolution model 330 may predict an error resolution comprising zero, one, or a plurality of changes to integration process 160 represented by the feature vector. The error resolution may comprise an indication of each change to be made to integration process 160. Each indication of a change may comprise a description of the change and/or an identifier of each component (e.g., step) affected by the change. The error resolution may comprise structural changes to integration process 160 and/or non-structural changes to integration process 160.

As discussed above, each feature vector may represent a lineage, including a sequence of steps, specified or otherwise received by a user during construction of an integration process 160 in module 320. In this case, error resolution model 330 is applied to this lineage to produce a predicted error resolution. When an integration process 160 is flattened into a plurality of lineages in subprocess 520, error resolution model 330 may be applied to each individual one of the feature vectors, representing the plurality of lineages, serially or in parallel. Then, the individual error resolutions, output by error resolution model 330 for each of the feature vectors, may be combined into a single error resolution.

In an embodiment, error resolution model 330 may output a plurality of distinct error resolutions. Each of the plurality of error resolutions may comprise an indication of each of one or more changes to integration process 160. In addition, each of the plurality of error resolutions may comprise a respective confidence value. The confidence value for an error resolution may represent the confidence that the error resolution will result in a successful execution of integration process 160. Error resolution model 330 may output a plurality of distinct error resolutions for a single feature vector or for a plurality of feature vectors (e.g., each representing a different lineage).

Conceptually, each of the plurality of error resolutions may represent a match between a lineage of the integration process 160 being constructed and a lineage in a failed configuration within the pairings of failed and successful configurations. Thus, in an embodiment, error resolution model 330 comprises a matching algorithm that is configured to match a lineage of the integration process 160 being constructed to similar lineages, as well as identical lineages. What is or is not a similar lineage may be determined by the matching algorithm, for example, according to a similarity metric between the lineages. Examples of suitable matching algorithms include, without limitation, string-matching algorithms (e.g., Needleman-Wunsch algorithm, Smith-Waterman algorithm, Levenshtein algorithm or other edit-distance algorithm, etc.), hashing and indexing algorithms (e.g., MiniHashing, Locality-Sensitive Hashing, etc.), pattern-matching algorithms (e.g., Knuth-Morris-Pratt algorithm, Boyer-Moore algorithm, etc.), neural networks (e.g., convolutional neural network (CNN), recurrent neural network (RNN), long short-term memory (LSTM), etc.), sequence-embedding algorithms (e.g., Word2Vec for shapes, transformer models, etc.), similarity-learning algorithms (e.g., Siamese networks, cosine similarity, Euclidean distance, etc.), and the like.

It should be understood that the difference between the matching failed configuration and the successful configuration, that has been paired with the matching failed configuration, represents the error resolution. The confidence value for an error resolution may be a function of how many occurrences of that same pairing of failed and successful configurations occur in historical data 310, with more occurrences resulting in a higher confidence value and fewer occurrences resulting in a lower confidence value. Alternatively, the confidence value may be computed as a function of one or more other metrics.

In an embodiment, only a subset of the plurality of error resolutions produced by error resolution model 330 may be output by error resolution model 330. For example, the number of error resolutions, output by error resolution model 330, may be limited to a predefined number (e.g., one, two, three, four, five, ten, etc.) of top error resolutions, ranked according to their confidence values. The predefined number may be a system setting and/or user setting. It should be understood that, if the predefined number is set to one, only a single error resolution, having the highest confidence value, will be output by error resolution model 330, if the predefined number is set to two, a maximum of two error resolutions, having the two highest confidence values, will be output by error resolution model 330, and so on and so forth. More generally, for a predefined number of N, a maximum of N error resolutions having the N highest confidence values will be output by error resolution model 330. Alternatively or additionally, only error resolutions having a confidence value greater than a predefined threshold value may be output by error resolution model 330. The predefined threshold value may be a system setting and/or user setting. Notably, the predefined number and predefined threshold value may be combined, such that a maximum of a predefined number of error resolutions, having the highest confidence values above the predefined threshold value, are output by error resolution model 330.

In an embodiment, error resolution model 330 comprises a generative AI model that is used to produce at least one error resolution. The generative AI model may be in addition to or instead of the non-generative AI model contemplated herein. In an embodiment of error resolution model 330 that comprises both a generative AI model and a non-generative AI model, the non-generative AI model and the generative AI model may both be used to produce error resolution(s). In this case, one or more error resolutions, output by the non-generative AI model, may be combined with the error resolution, output by the generative AI model, to produce a plurality of error resolutions. In an alternative embodiment, the generative AI model is only used when the non-generative AI model is unable to provide a suitable error resolution, for example, when the non-generative AI model outputs no error resolution or does not output any error resolution having a confidence value above the predefined threshold value.

In an embodiment that utilizes a generative AI model, a prompt may be generated using a representation of the configuration of the integration process 160 under construction. The representation may comprise a lineage of the integration process 160, the configuration of one or more components of the integration process 160, and/or the like. Alternatively or additionally, the prompt may be generated using one or more of the error resolutions output by the non-generative AI model. In either case, the prompt may be generated by inserting the representation of the configuration of the integration process 160 and/or the error resolution(s) output by the non-generative AI model into a dedicated portion of a predefined template, to produce the prompt. The predefined template may also comprises a pre-conversation and/or post-conversation to provide context and/or instructions for the generative AI model. The generated prompt may then be input to the generative AI model to produce an output representing an error resolution comprising one or more changes to the integration process 160 under construction.

The generative AI model may comprise or consist of a large language model, such as the Generative Pre-trained Transformer (GPT). GPT-4 is the fourth-generation language prediction model in the GPT-n series, created by OpenAI™ of San Francisco, California. GPT-4 has been pre-trained on a vast amount of text from the open Internet. While GPT-4 is provided as an example, it should be understood that the generative language model may be any generative language model, including past and future generations of GPT, as well as other large language models. Examples of other suitable large language models include, without limitation, the Claude family of large language models (e.g., Claude 3 Opus) developed by Anthropic PBC of San Francisco, California, the Falcon large language model (e.g., Falcon 180B) released by the United Arab Emirates' Technology Innovation Institute (TII), the Large Language Model Meta AI (LLaMA) model (e.g., LLAMA 2) released by Meta AI of New York, New York, or the like. Alternatively or additionally, the generative language model may comprise or consist of a code-completion model that is trained to produce data structures, such as a configuration of an integration process 160, including a lineage, a configuration of one or more steps in the lineage, and/or the like. In an embodiment, a pre-trained generative AI model is used as a base model that is trained, for instance, with few-shot learning for the specific task of generating an error resolution for a lineage of an integration process 160, to produce the generative AI model.

In subprocess 540, the error resolution, output by error resolution model 330 and comprising or consisting of the predicted error resolution, if any, for the integration process 160 under construction, may be input to one or more downstream functions. For example, the error resolution may be provided as input to module 335, which may generate a prompt for generative language model 340 based on the predicted error(s), or may be provided as input to module 345, which may generate a visual representation of the error resolution.

In an embodiment, a new development history may be generated and added to historical integration data 310, for future training of error resolution model 330, whenever the integration process 160 that was being constructed is modified by an error resolution output by error resolution model 330, deployed, and executed successfully. In this case, the configuration of the integration process 160, prior to the adoption of the error resolution, and the configuration of the integration process 160, after the adoption of the error resolution, may be paired together into a new pairing of failed and successful configurations. This new pairing may be added to a future training dataset, which is used to train or tune error resolution model 330 in the future, in order to positively reinforce the adopted error resolution within future inferences by error resolution model 330.

7. Feature Processing

Figure 6:
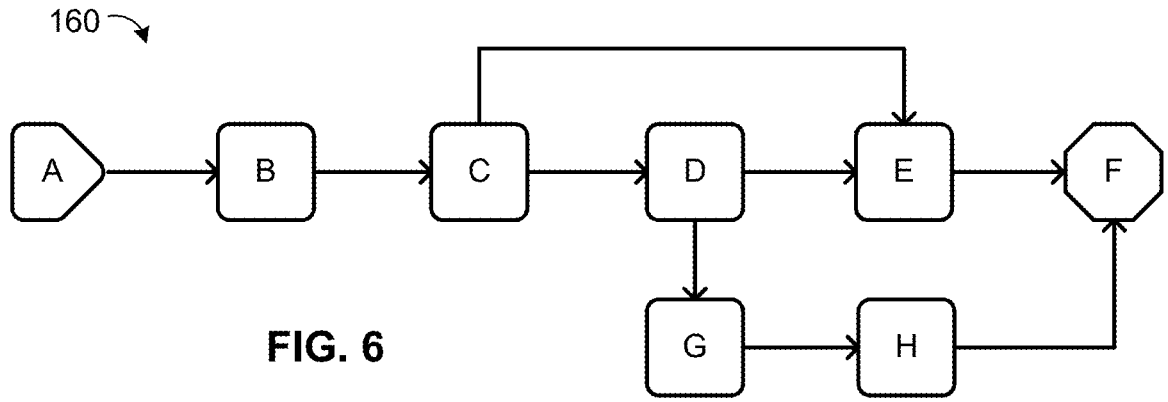
FIG. 6 illustrates a simple integration process, according to an example.

FIG. 6 illustrates a simple integration process 160, according to an example. As illustrated, this exemplary integration process 160 comprises steps A, B, C, D, E, F, G, and H, with step A representing a starting step, step F representing an ending step, and steps C and D representing branching (e.g., decision) steps.

Figure 7:
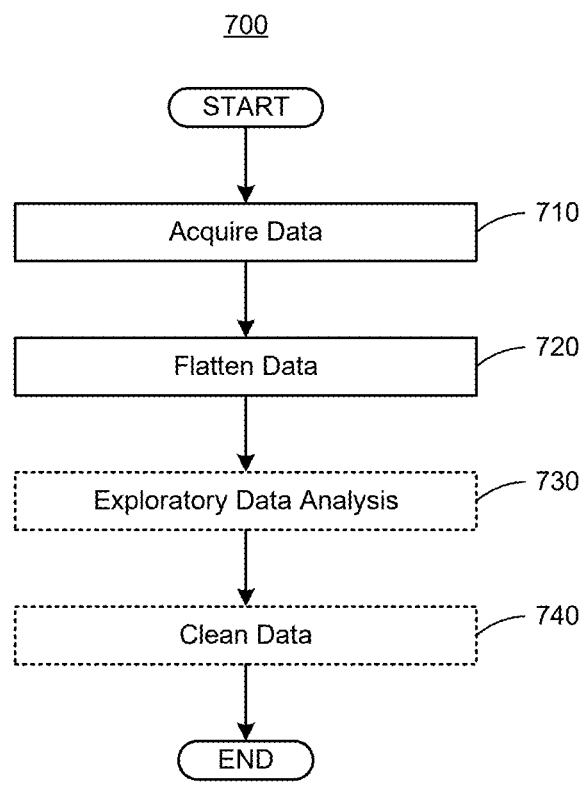
FIG. 7 illustrates a process for feature processing, according to an embodiment.

FIG. 7 illustrates a process 700 for feature processing, according to an embodiment. Process 700 will be described with reference to the exemplary integration process 160 illustrated in FIG. 6. Process 700 may be implemented in subprocess 410 of module 315 of server application 112 and/or subprocess 520 of module 325 of server application 112 to generate the described feature vectors for the lineages. While process 700 is illustrated with a certain arrangement and ordering of subprocesses, process 700 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

In subprocess 710, integration data, representing an integration process 160, are acquired. It should be understood that in the case of feature processing in subprocess 410, the integration data will be acquired from historical integration data 310, whereas, in the case of feature processing in subprocess 520, the integration data will be acquired from module 320 for an integration process 160 under construction. In either case, the integration data may comprise the components of integration process 160, including the steps in integration process 160 and the configuration of each step in integration process 160. For simplicity, it will be assumed that process 700 acts on integration data for a single integration process 160. However, it should be understood that, in practice, process 700 may act on batches of integration data for a plurality of integration processes 160.

The integration data may comprise a representation of the sequence of steps in the represented integration process 160, for example, as a sequence of step identifiers. In addition, integration process 160 and/or each step in integration process 160 may be associated in the integration data with metadata. The metadata may comprise the configuration properties of integration process 160 and/or each step in integration process 160. For example, the configuration properties of a step may include, without limitation, an identifier of the prior step, a type of the prior step, an identifier of the next step, a type of the next step, a type of connector represented by the step, a type of action configured for the step (e.g., get, send, execute, upsert, etc.), an end point of the connector represented by the step, an object of the connector represented by the step, the input(s) to the step, the type of input to the step, the output(s) from the step, the type of output from the step, and/or the like. Notably, not all steps in an integration process 160 will necessarily have values for every metadata field. Additionally or alternatively, the metadata may comprise statistical properties of integration process 160 and/or each step in integration process 160.

In subprocess 720, the integration data, acquired in subprocess 710, are flattened. During this flattening, an integration process 160 that comprises a plurality of paths may be flattened into a plurality of lineages, in which each lineage consists of a single one of the plurality of paths. For example, an integration process 160 that comprises multiple branching paths may be divided into a plurality of lineages that each consists of a single path from a starting step to an ending step of the integration process 160. It should be understood that an integration process 160 that consists of a single path would not need to be flattened in this manner.

The exemplary integration process 160 would be flattened into at least three lineages in subprocess 720:

(1) A→B→C→D→E→F;
(2) A→B→C→E→F; and
(3) A→B→C→D→G→H→F.

In an embodiment, each path may comprise both a starting step (e.g., A in this example) and an ending step (e.g., F in this example) of the integration process 160 from which it is derived. In other words, subprocess 720 may flatten each integration process 160, comprising multiple paths through integration process 160, whether in historical integration data 310 or in the integration data of an integration process 160 under construction, into a plurality of lineages that each consists of a single path through integration process 160. It should be understood that, in the case of subprocess 410, a representation of each of this plurality of lineages may be included in dataset 415. In the case of subprocess 520, a representation of each of this plurality of lineages may be input to error resolution model 330.

In an embodiment, in addition to lineages with starting and ending steps, an integration process 160 may be flattened into lineages that each consists of a sub-path between a starting and ending step. For example, in addition to lineages (1)-(3) above, the exemplary integration process 160 could also produce sub-lineages, including, for example, A→B, A→B→C, A→B→C→D, A→B→C→D→E, A→B→C→E, A→B→C→D→G, A→B→C→D→G→H, B→C, B→C→D, B→C→D→E, B→C→D→E→F, C→E, C→E→F, C→D, C→D→G, and so on and so forth. More generally, subprocess 720 could flatten an integration process 160, whether consisting of a single path or comprising multiple paths, into any set of paths (i.e., lineages) or sub-paths (i.e., sub-lineages) that comprise two or more steps. In other words, subprocess 720 may flatten an integration process 160 into one or more lineages that each consists of a sub-path through integration process 160. In the case of subprocess 410, a representation of each of these lineage(s) may be included in dataset 415. In the case of subprocess 520, a representation of each of these lineage(s) may be input to error resolution model 330. For the sake of simplicity, the term "lineage" should be understood to refer to both the complete lineage (i.e., consisting of a full path from the start step to an end step) of an integration process 160 and a sub-lineage (i.e., consisting of a sub-path) of an integration process 160.

In subprocess 730, an exploratory data analysis may be performed on the flattened integration data, comprising representations of the lineages and their associated metadata (e.g., configuration properties, statistical properties, etc.). Exploratory data analysis may comprise analyzing a distribution of the integration data (e.g., as histograms, bar plots, etc.), identifying patterns, checking for missing values, identifying imbalances, identifying outliers, identifying duplicate data, identifying essential variables, identifying non-essential variables, checking assumptions, and/or the like. In general, exploratory data analysis may be used to determine how to clean a large set of data, such as historical integration data 310. Such exploratory data analysis may not be relevant to module 325, which will generally process only a single integration process 160. Thus, subprocess 730 may be omitted from subprocess 520 of module 325.

In subprocess 740, the flattened data are cleaned to produce a clean feature vector that conforms to the input schema of error resolution model 330. If subprocess 730 was executed, the cleaning may be based on the results of the exploratory data analysis in subprocess 730. In this case, cleaning may include, without limitation, removing lineages with missing values, removing lineages with outlying values, removing duplicate data, removing non-essential variables, fixing imbalances (e.g., by discarding data and/or synthesizing data), and/or the like. In an embodiment, cleaning comprises removing duplicate lineages, removing lineages with less than a certain number of steps (e.g., less than two steps), removing lineages with multiple start steps, removing connector identifiers for connector steps and/or positional arguments for other types of steps, normalizing the remaining data, and/or the like. In an embodiment, module 325 may receive integration data that are already clean (e.g., module 320 may act as a gatekeeper against noisy data), in which case subprocess 740 may be omitted from subprocess 520 of module 325.

In an embodiment, each lineage, resulting from the flattening in subprocess 720 and/or the cleaning in subprocess 740, is converted into a feature vector. Each feature vector may comprise an entry for each step in the lineage. Each entry may comprise at least the step identifier for the respective step. Each entry may also comprise one or more configuration properties, statistical properties, or other metadata associated with the respective step. In this case, each entry may be a tuple of values representing one of the steps in the lineage. The entries may be ordered, within the feature vector, in the order that the respective steps appear in the represented lineage. For example, for lineage (1) from the exemplary integration process 160, the feature vector may be represented as $$F_1=([A,p_{A1},p_{A2},\ldots p_{AN}],[B,p_{B1},p_{B2},\ldots p_{BN}],\ldots [F,p_{F1},p_{F2},\ldots p_{FN}])$$

in which $p_{ij}$ represents the value of a property j in the metadata for step i. In any case, the feature vector may be output by the feature engineering of process 700 to a downstream function, such as subprocess 420 in module 315 or subprocess 530 in module 325.

In the case of subprocess 410, each feature vector may be annotated with an error resolution. As discussed elsewhere herein, the error resolution may comprise one or more changes that transformed an integration process 160 from a failed configuration to a successful configuration, based on the development history of integration process 160 within historical integration data 310.

8. Graphical User Interface

Boomi® provides an iPaaS platform that has revolutionized the integration/middleware space with a drag-and-drop graphical user interface that eliminates the need for custom code in the construction of integration processes 160. In particular, the graphical user interface comprises a virtual canvas over which a user may drag and drop shapes, representing steps that perform specific functions, and connect the shapes to define data flows between their respective functions. Thus, the user may intuitively construct an integration process 160 by simply adding, configuring, and connecting shapes in an intuitive manner.

However, prior to deployment, developers are often uncertain about whether or not the integration processes 160 that they construct will actually run. Accordingly, disclosed embodiments provide an easy-to-use, intuitive graphical user interface for resolving detected errors in integration processes 160 under construction. This graphical user interface may be used by both novice and expert developers to efficiently troubleshoot their integration processes 160 prior to deployment. An embodiment of this graphical user interface is described below.

Figure 8A:
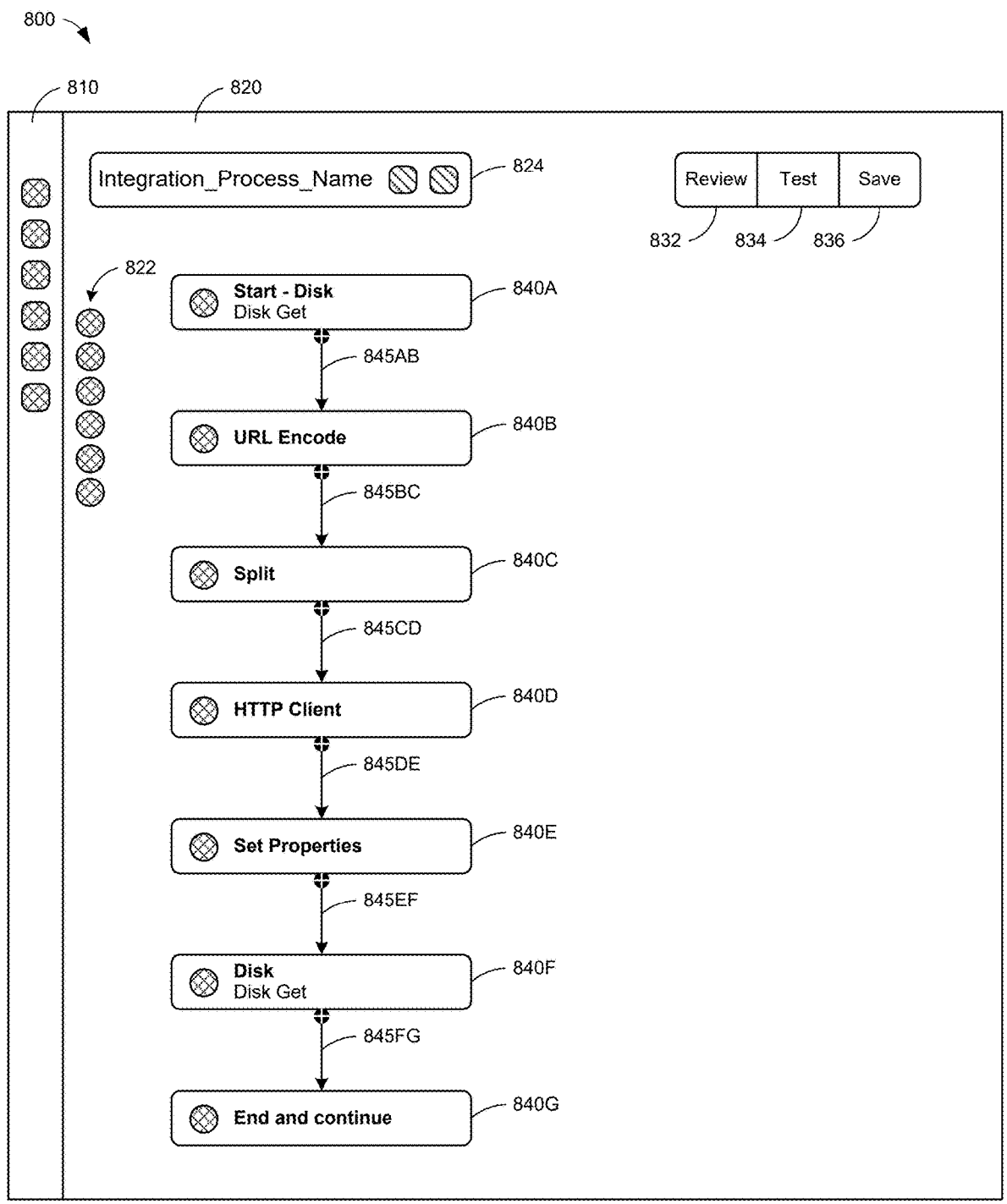
FIGS. 8A-8H illustrate a graphical user interface, according to an embodiment.

FIG. 8A illustrates an example graphical user interface 800 that may be used to construct an integration process 160, according to an embodiment. Graphical user interface 800 may be provided by user interface 150 of server application 112. In the illustrated example, graphical user interface 800 comprises a navigation bar 810 and a virtual canvas 820. Virtual canvas 820 enables a user to drag and drop representations (i.e., "shapes") of steps at positions within an integration process 160 to be constructed, and connect these representations to form one or more lineages (i.e., paths or sub-paths).

Virtual canvas 820 may comprise a shape palette 822, from which new shapes can be dragged and dropped on virtual canvas 820, and a header 824 which may comprise information (e.g., name) for the integration process 160 as a whole, one or more inputs for setting the value of one or more parameters of integration process 160 as a whole, and/or the like. In addition, virtual canvas 820 may comprise a review input 832 for triggering the error prediction function for integration process 160, a test input 834 for testing integration process 160 (e.g., executing integration process 160 in a test environment), and a save input 836 for saving integration process 160 in the current configuration.

In the illustrated example, a user has constructed an integration process 160 with shapes 840A, 840B, 840C, 840D, 840E, 840F, and 840G, which each represents a step in integration process 160. Each of shapes 840 is connected to at least one adjacent shape 840 by a connection 845. In the illustrated example, shape 840A is connected to shape 840B by connection 845AB, shape 840B is connected to shape 840C by connection 845BC, shape 840C is connected to shape 840D by connection 845CD, shape 840D is connected to shape 840E by connection 845DE, shape 840E is connected to shape 840F by connection 845EF, and shape 840F is connected to shape 840G by connection 845FG. Since there are no branches, integration process 160 consists of a single path, and therefore, a single start-to-end lineage. However, if sub-paths are considered, integration process 160 comprises a plurality of other lineages representing sub-paths.

Figure 8B:
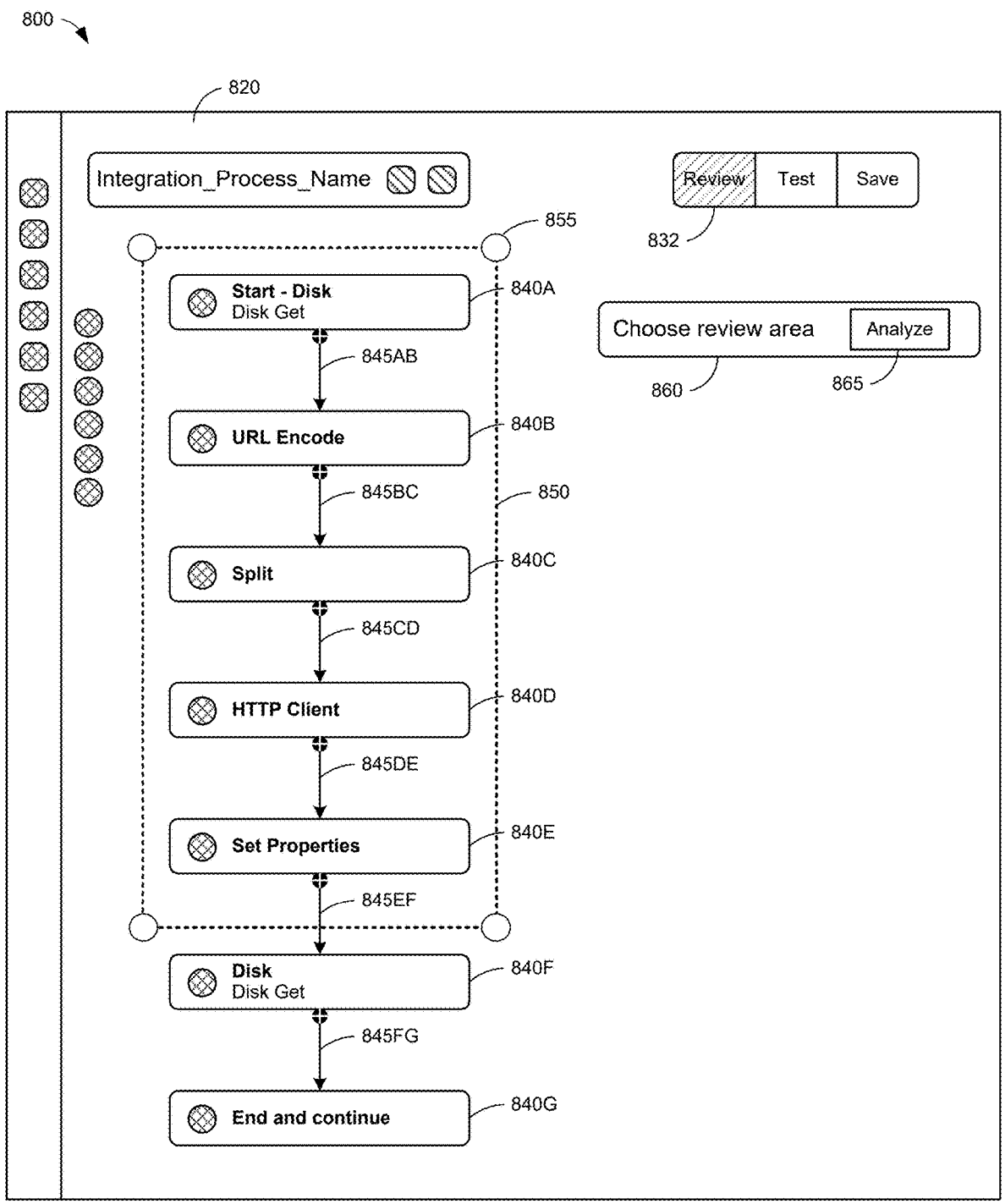

FIG. 8B illustrates graphical user interface 800, after a user has selected review input 832, according to an embodiment. Responsively, graphical user interface 800 has been updated to display a selection box 850 with corner points 855, and a prompt dialog 860 with an analyze input 865, on virtual canvas 820. Prompt dialog 860 prompts the user to choose a review area. The user may select and drag any of corner points 855 to resize and reshape selection box 850. In this manner, the user may select one or more shapes 840 representing the precise lineage that the user wishes to analyze. For instance, in the illustrated example, the user has manipulated selection box 850 to select a lineage, represented by shapes 840A-840E, and excluding shapes 840F and 840G. From the perspective of server application 112, server application 112 may receive the selection of one or more shapes 840, representing a lineage, on virtual canvas 820 by receiving a selection of review input 832, displaying selection box 850 on virtual canvas 820, and receiving a manipulation of selection box 850 by the user.

The user may then select analyze input 865 to trigger the error prediction. In particular, selection of analyze input 865 may trigger module 325. In this case, graphical user interface 800 receives a lineage, consisting of the sequence of steps represented by the shapes 840 in selection box 850, from the user, and passes integration data for this lineage to an error detection function of server application 112, for example, as discussed in the error prediction application, to detect one or more errors. When at least one error is detected, the user may be provided with a resolve input for resolving the detected error(s). When the resolve input is selected, module 325 may apply error resolution model 330 to the lineage, and potentially sub-lineages, as represented by one or more feature vector(s), to produce a predicted error resolution. The predicted error resolution may be passed to module 335, which generates a prompt and inputs the prompt to generative language model 340 to produce an output, or, in an alternative embodiment, passed to module 345 directly. Module 345 may process the output of generative language model 340, or error resolution model 330, into a dialog or other visual representation that is displayed on graphical user interface 800 by module 350.

Figure 8C:
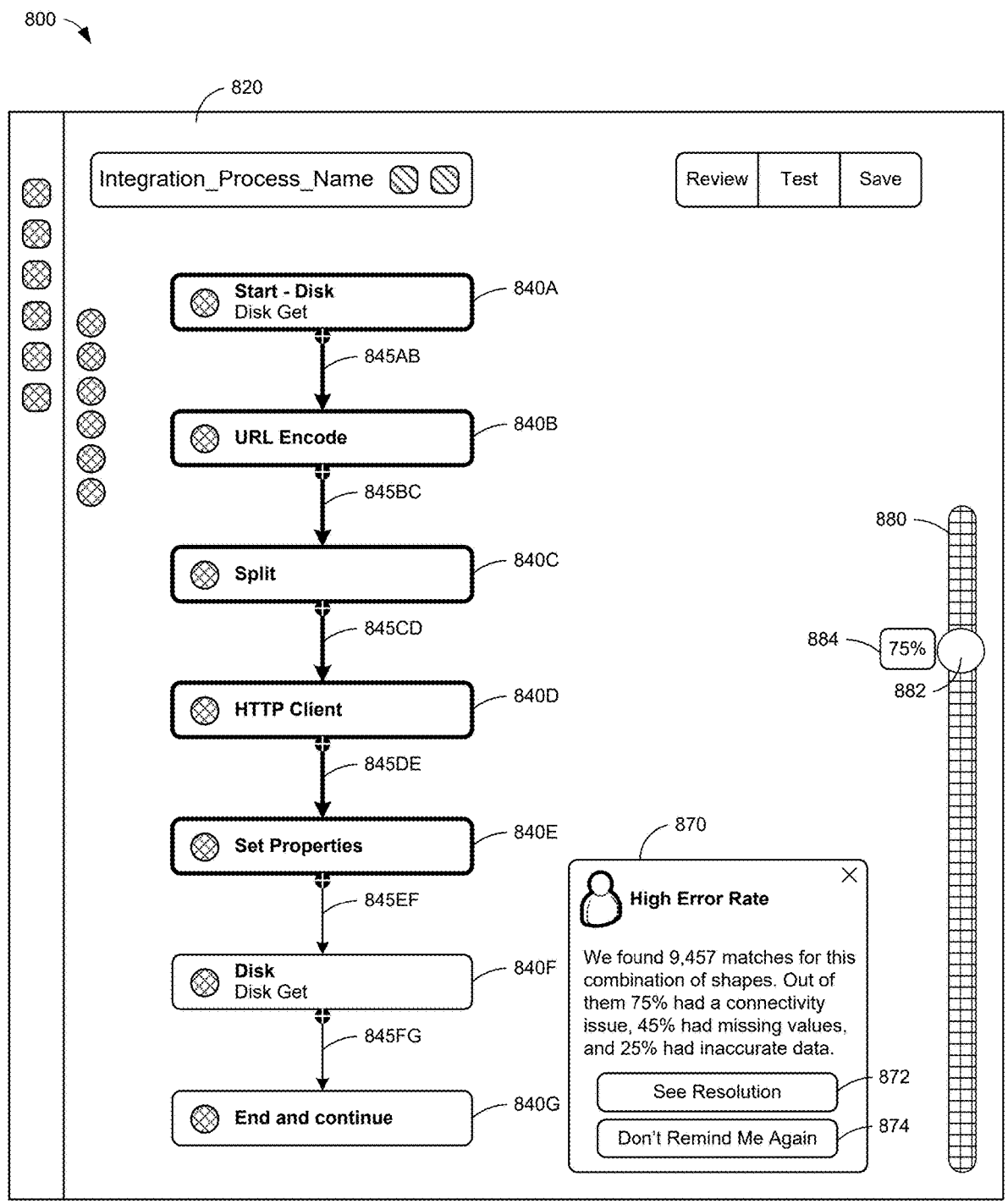

FIG. 8C illustrates graphical user interface 800, after a user has selected analyze input 865, according to an embodiment. The set of shapes 840 and connections 845, which were within selection box 850 when analyze input 865 was selected and are impacted by a predicted error, may be highlighted within virtual canvas 820. The highlighting may be color-coded, with the color of the highlighting selected based on the severity of the predicted error associated with those shapes 840 and/or connections 845. For example, the color green may be selected in the absence of a predicted error, the color yellow or orange may be selected for errors of low or medium severity, and the color red may be selected for errors of high severity.

In addition, graphical user interface 800 has been updated to include dialog 870. Dialog 870 comprises a description of the error prediction. This description may comprise a natural-language expression that indicates the predicted error(s), if any. Dialog 870 may also comprise a resolve input 872 and a dismiss input 874. Selection of resolve input 872 may trigger module 325, as discussed elsewhere herein. Conversely, selection of dismiss input 874 may trigger module 320 to remove resolve input 872 and dismiss input 874 from dialog 870, remove dialog 870 from graphical user interface 800, and/or the like.

In addition, graphical user interface 800 may be updated to include a severity meter 880. Severity meter 880 may comprise and indicate severity on a bar with a first end (e.g., lower end) representing least severe (i.e., no errors) and a second end (e.g., upper end) representing most severe. The bar may be shaded according to a color spectrum, for example, from green at the first end to red at the second end, to indicate the progression of severity. In addition, severity meter 880 may comprise a marker 882 and a severity indication 884 that are positioned at a location, with respect to the bar, that is indicative of the severity of the represented error. For example, marker 882 and severity indication 884 may be located at the first end when the severity is 0% (i.e., no errors), located at the second end when the severity is 100%, located 25% of the length between the first end and the second end when the severity is 25%, located 50% of the length between the first end and the second end when the severity is 50%, and so on and so forth. The color-coding of the highlighting of shapes 840 and/or connections 845 may correspond to the color at the particular location, in the color spectrum in the bar of severity meter 880, at which marker 882 and severity indication 884 are positioned.

FIGS. 8D-8H each illustrate graphical user interface 800, after a user has selected resolve input 872, for one of five respective error resolutions, according to an embodiment. In each case, any shapes 840 and connections 845, that are affected by the change, may be highlighted, relative to unaffected shapes 840 and connections 845. In addition, in each case, a visual representation of the error resolution, output by error resolution model 330 (e.g., in subprocess 540 of module 325), may be overlaid on virtual canvas 820. Each visual representation of an error resolution may comprise, for each change, a dialog that comprises a visual indication 890 of the change, relative to shapes 840 on virtual canvas 820, a first input 872 for applying the change, and a second input 874 for dismissing the change. Selection of first input 872 may trigger module 320 to update virtual canvas 820 to reflect (i.e., accept) the change associated with first input 872. Conversely, selection of second input 874 may trigger module 320 to remove (i.e., dismiss) the dialog for the change associated with second input 874. Thus, each change in the error resolution may be accepted or dismissed independently from any other change in the error resolution.

Figure 8D:
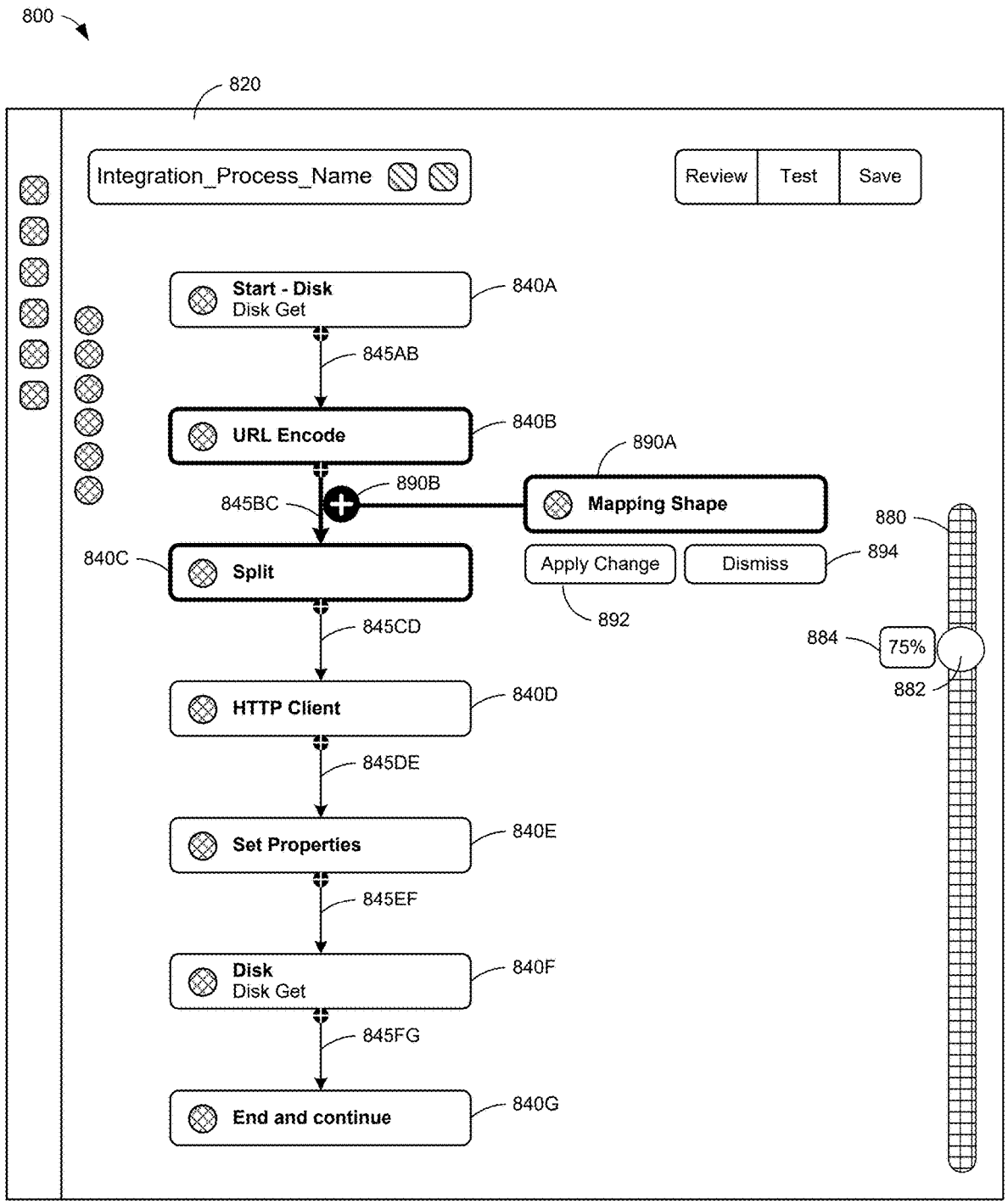

FIG. 8D illustrates graphical user interface 800, after a user has selected resolve input 872, in an example in which the error resolution comprises adding a new step, according to an embodiment. In particular, the error resolution comprises a structural change of adding a new step, represented by a mapping shape, between shapes 840B and 840C in the selected lineage (e.g., selected using selection box 850). In this case, visual indication 890 of the change comprises a new shape 890A representing the new step, and a marker 890B of a position at which to add the new step. As illustrated, new shape 890A may be connected to marker 890B by a line or arrow. If first input 892 is selected in the illustrated scenario, virtual canvas 820 will be updated to add shape 890A between shapes 840B and 840C, connect shape 840B to shape 890A, and connect shape 890A to shape 840C.

Figure 8E:
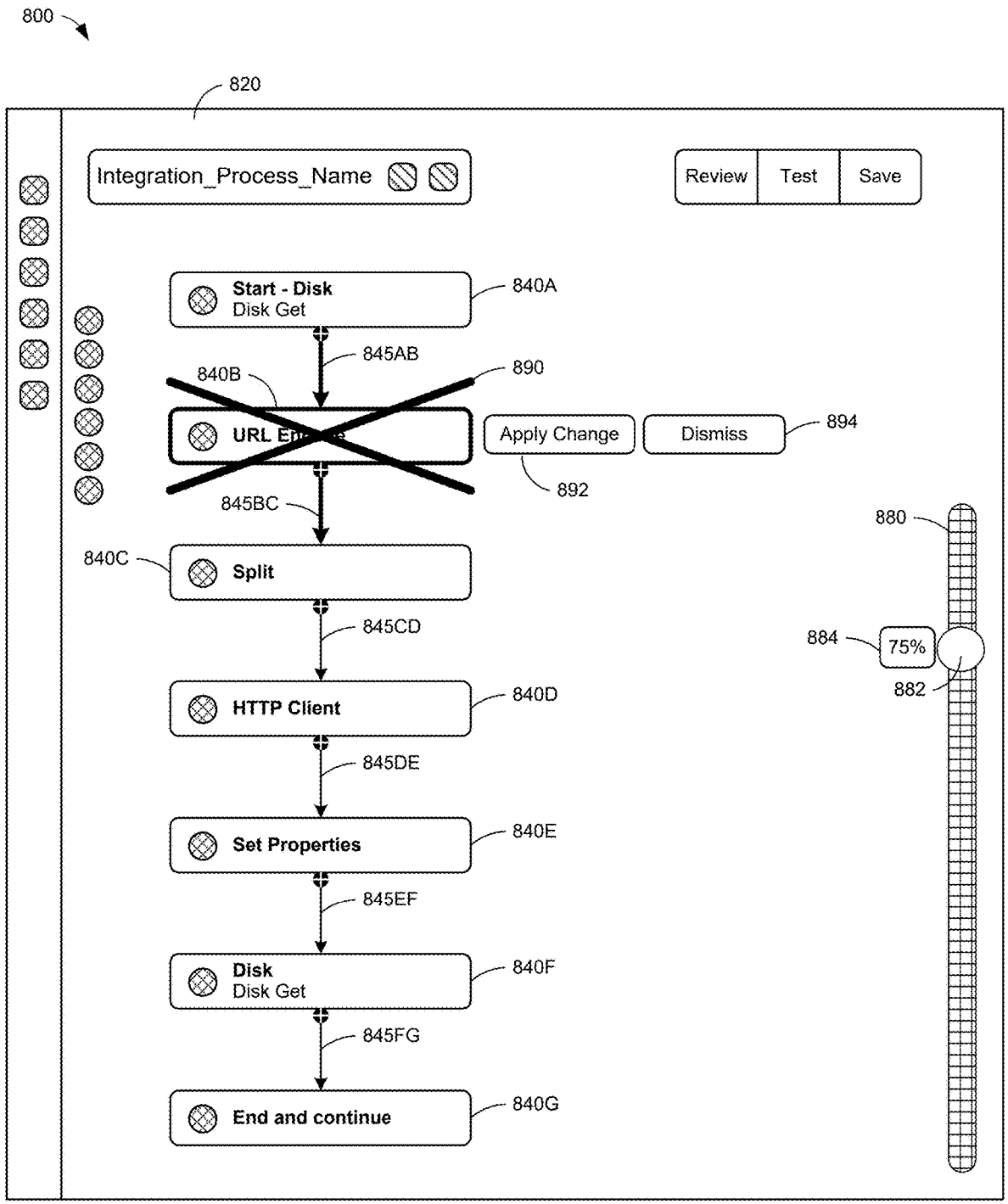

FIG. 8E illustrates graphical user interface 800, after a user has selected resolve input 872, in an example in which the error resolution comprises deleting an existing step, according to an embodiment. In particular, the error resolution comprises a structural change of deleting an existing step, represented by shape 840B, from the sequence of steps in the selected lineage (e.g., selected using selection box 850). In this case, visual indication 890 of the change comprises or consists of a strikethrough of shape 840B. The strikethrough is illustrated as an x-shaped strikethrough, but could, alternatively, comprise or consist of a single strikethrough, double strikethrough, or the like. If first input 892 is selected in the illustrated scenario, virtual canvas 820 will be updated to remove shape 840B and connect shape 840A directly to shape 840C.

Figure 8F:
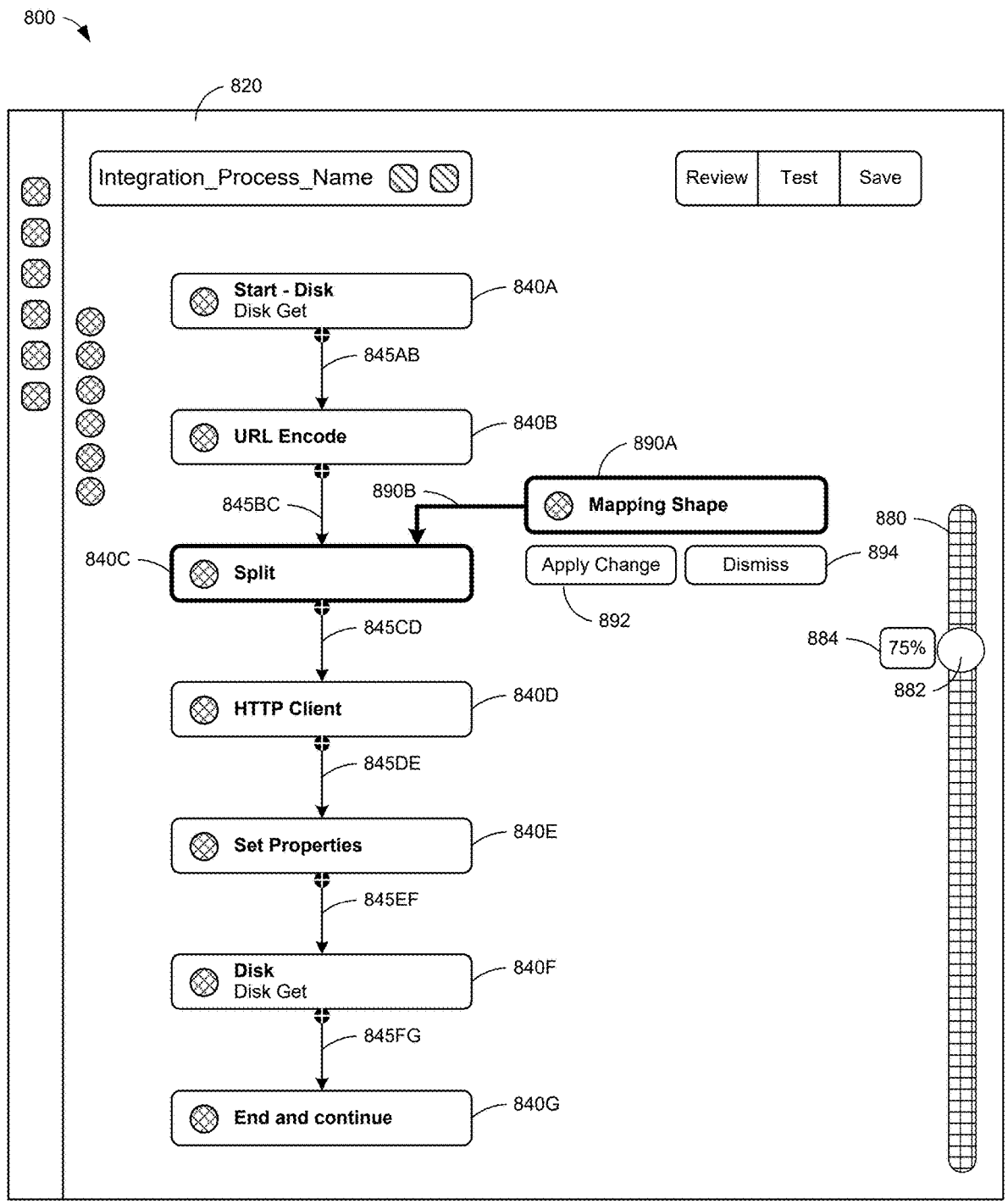

FIG. 8F illustrates graphical user interface 800, after a user has selected resolve input 872, in an example in which the error resolution comprises substituting an existing step with a new step, according to an embodiment. In particular, the error resolution comprises a structural change of substituting an existing step, represented by shape 840C, in the sequence of steps in the selected lineage (e.g., selected using selection box 850), with a new step, represented by new shape 890A. In this case, visual indication 890 of the change comprises or consists of new shape 890A, representing the new step, and a connection 890B between new shape 890A and shape 840C. Connection 890B may be a line or arrow from new shape 890A to existing shape 840C. If first input 892 is selected in the illustrated scenario, virtual canvas will be updated to replace shape 840C with shape 890A.

Figure 8G:
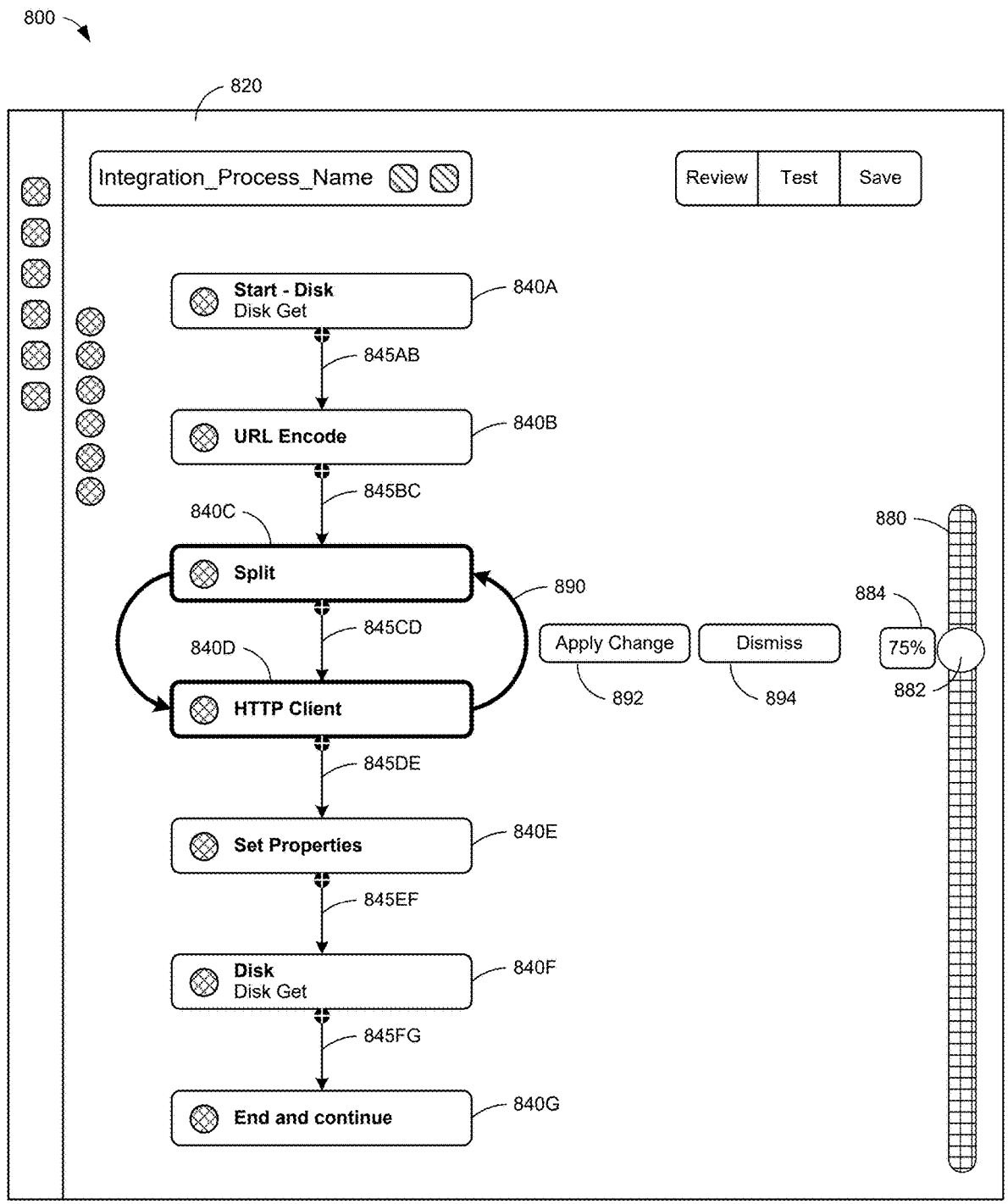

FIG. 8G illustrates graphical user interface 800, after a user has selected resolve input 872, in an example in which the error resolution comprises transposing two existing steps, according to an embodiment. In particular, the error resolution comprises a structural change of transposing an existing step, represented by shape 840C, with another existing step, represented by shape 840D. In this case, visual indication 890 of the change comprises or consists of at least one arrow between shapes 840C and 840D, and preferably, a first arrow from shape 840C to 840D and a second arrow from shape 840D to shape 840C. It should be understood that, in this context, transposition refers to the reversal in order of two steps. In other words, if first input 892 is selected in the illustrated scenario, virtual canvas 820 will be updated to move shape 840C to the current position of shape 840D and move shape 840D to the current position of shape 840C.

Figure 8H:
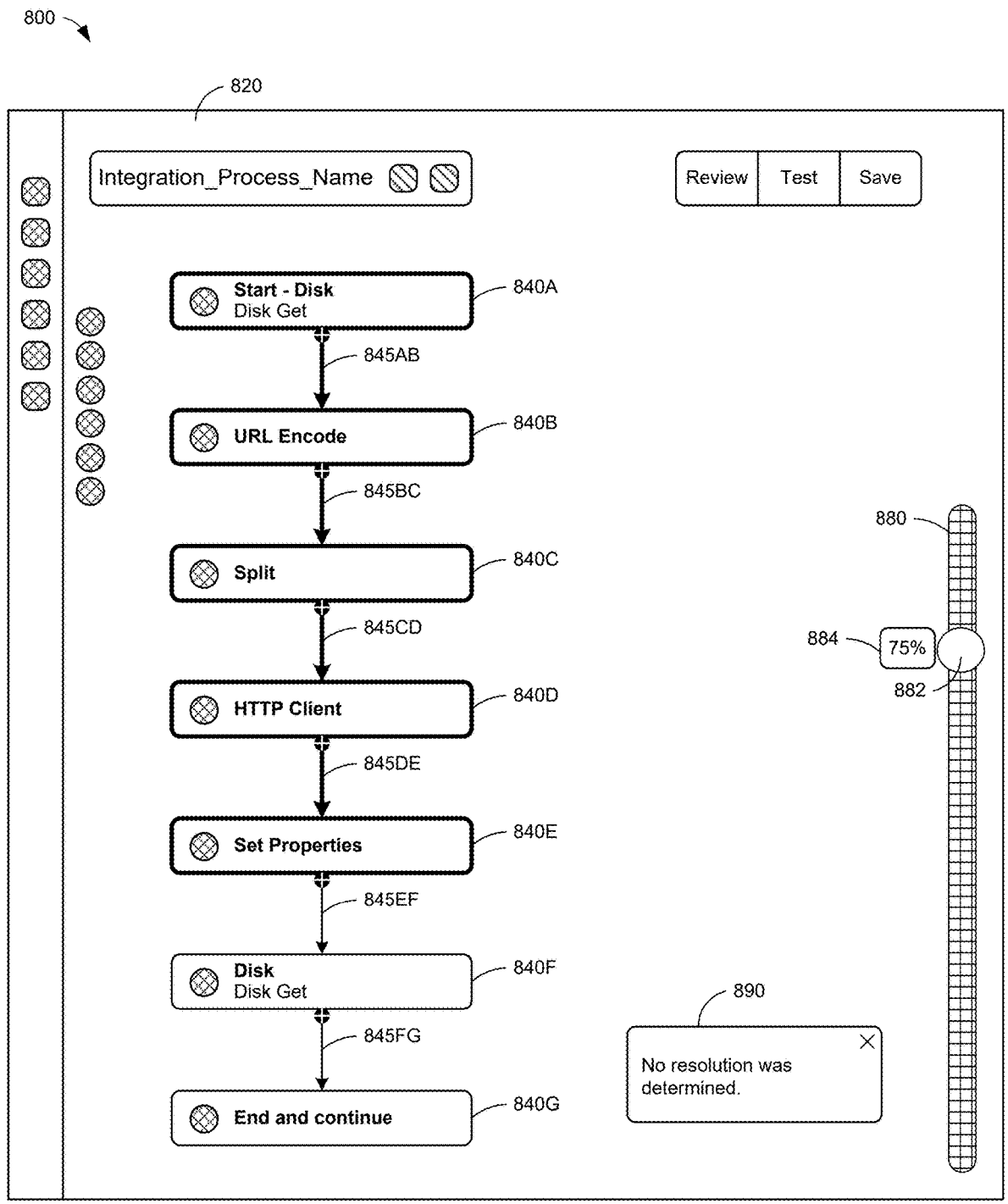

FIG. 8H illustrates graphical user interface 800, after a user has selected resolve input 872, in an example in which the error resolution is empty or otherwise undetermined, according to an embodiment. In this case, visual indication 890 may comprise an indication that no resolution was determined. Visual indication 890 may comprise or consist of a natural-language expression.

Figure 9A:
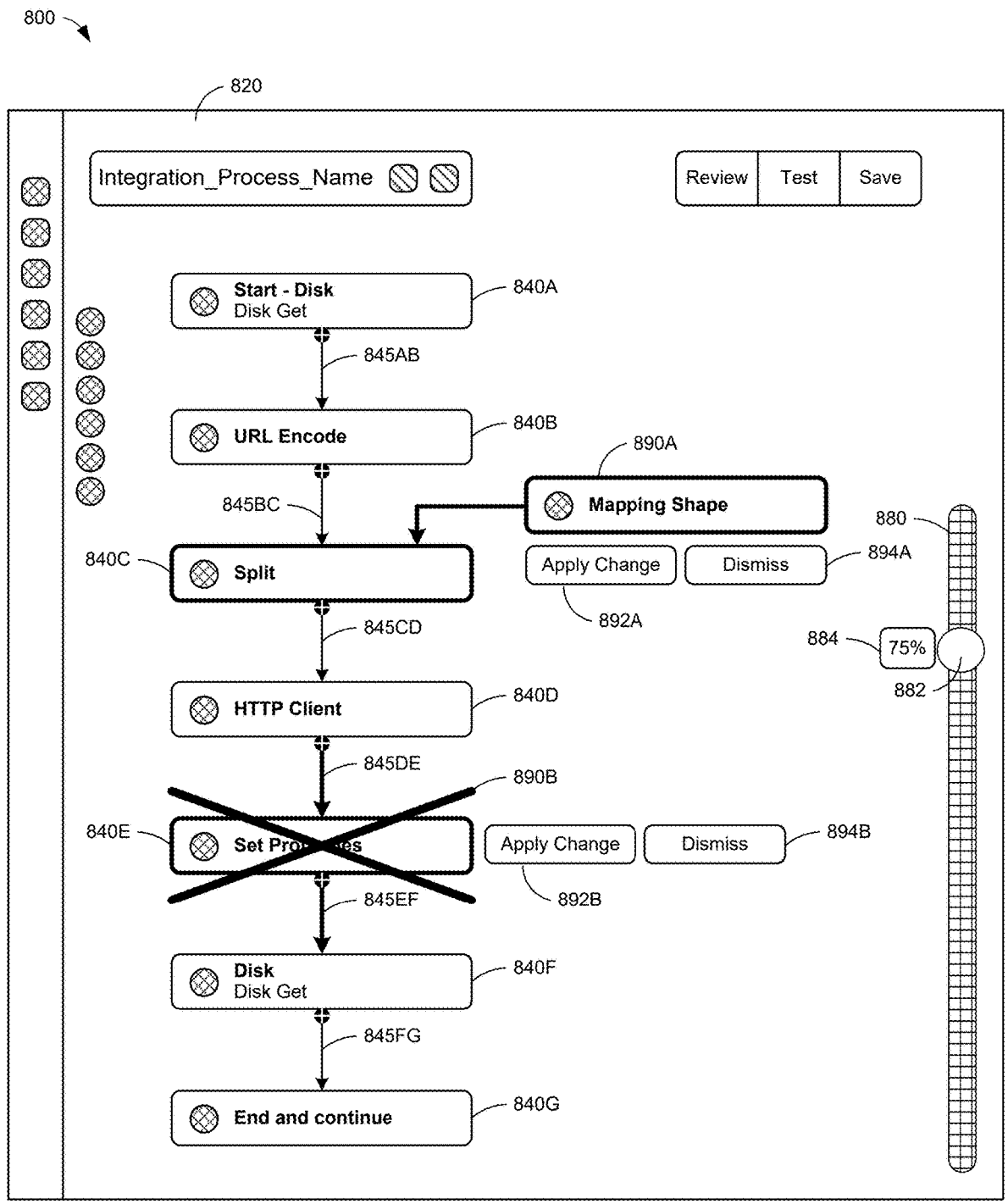
FIGS. 9A-9C illustrate a graphical user interface in an example use case, according to an embodiment.

FIG. 9A illustrates graphical user interface 800, after a user has selected resolve input 872, in an example in which the error resolution comprises a plurality of changes, according to an embodiment. In this example, the error resolution comprises a structural change of substituting an existing step with a new step and deleting an existing step. In particular, a first dialog indicates with a first visual indication 890A that, in a first change, the existing step, represented by shape 840C, should be replaced with a new step, represented by shape 890A, and comprises a first input 892A for applying the first change and a second input 894A for dismissing the first change. In addition, a second dialog indicates with a second visual indication 890B that, in a second change, an existing step, represented by shape 840E, should be deleted, and comprises a first input 892B for applying the second change and a second input 894B for dismissing the second change.

Figure 9B:
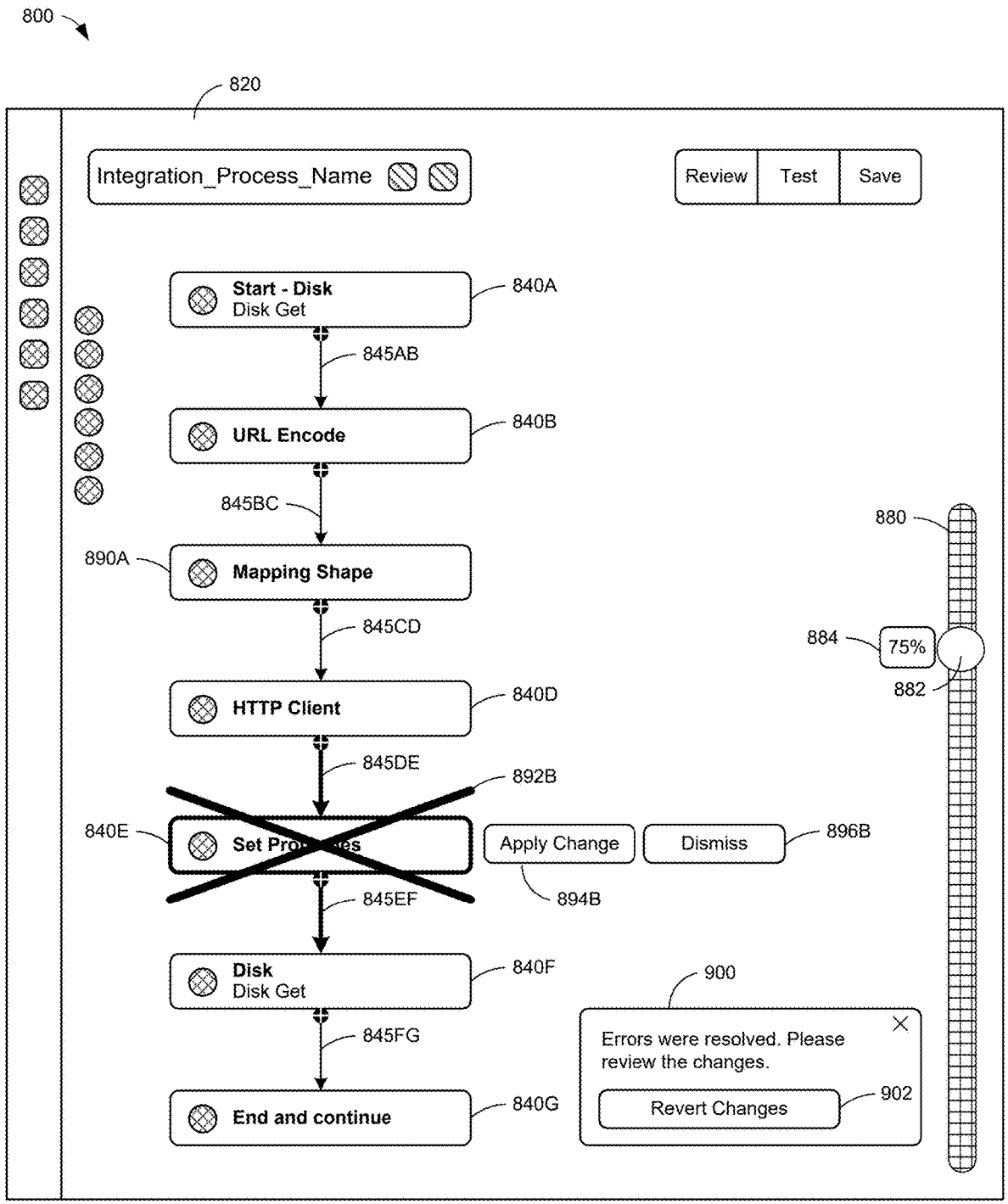

FIG. 9B illustrates graphical user interface 800, after a user has selected first input 892A of the first dialog, according to an embodiment. As a result of the user's decision to apply the first change, virtual canvas 820 has been updated to replace shape 840C with shape 890A, and remove the first dialog. In addition, a dialog 900 has been overlaid over virtual canvas 820 to confirm that the first change was applied (e.g., in natural language). Dialog 900 comprises a revert input 902 for reverting the first change (i.e., undoing the first change).

Figure 9C:
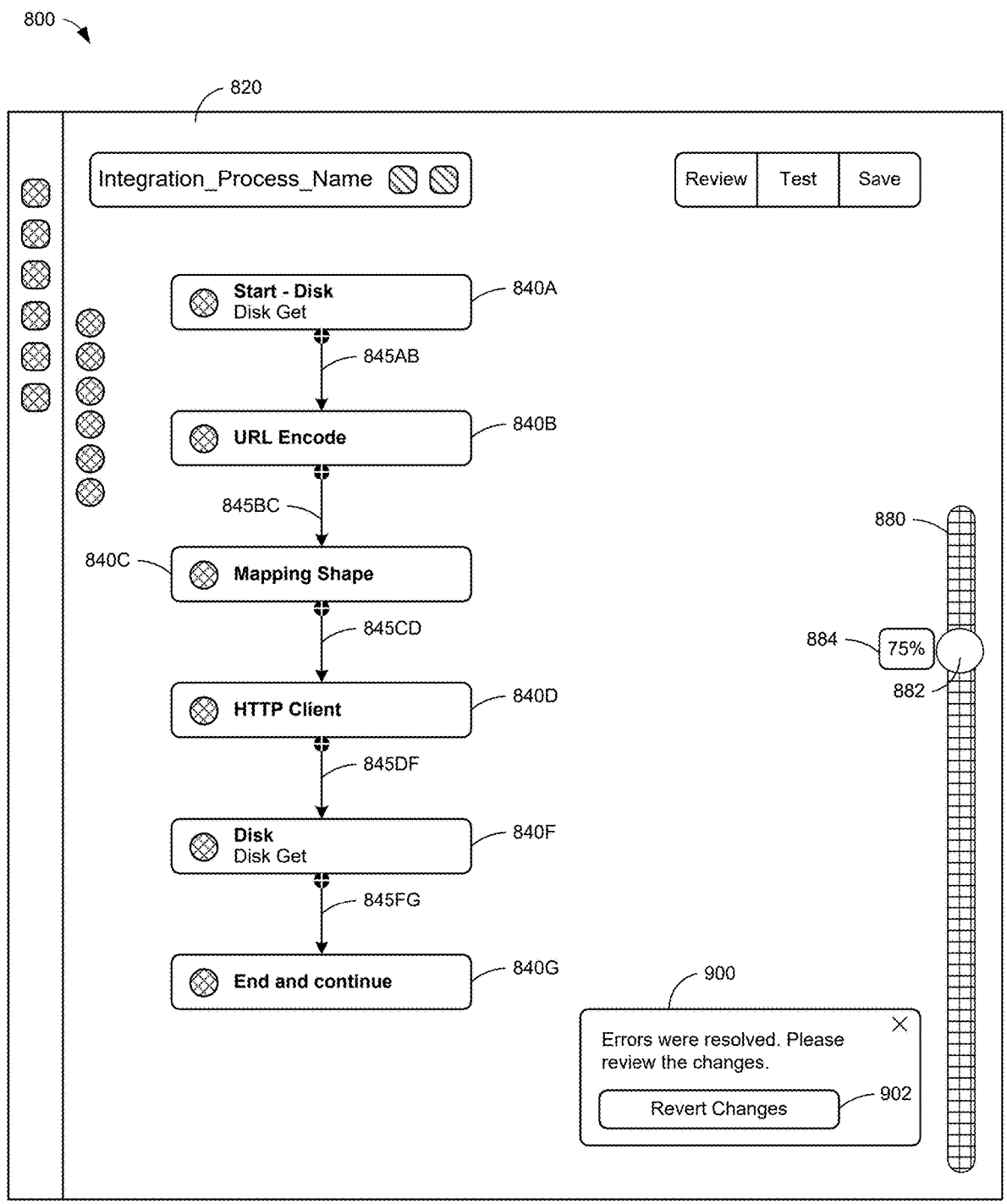

FIG. 9C illustrates graphical user interface 800, after a user has selected first input 892B of the second dialog, according to an embodiment. As a result of the user's decision to apply the second change, virtual canvas 820 has been updated to remove shape 840E, representing the deleted step, and to add a connection 845DF between shapes 840D and 840F. In addition, a dialog 900 has been overlaid over virtual canvas 820 to confirm that the second change was applied (e.g., in natural language). Dialog 900 comprises a revert input 902 for reverting the second change (i.e., undoing the second change).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
    during a building phase,
        collect historical integration data from a plurality of integration platforms managed through an integration platform as a service (iPaaS) platform, wherein the historical integration data comprise, for each of a plurality of integration processes, a development history of that integration process including at least one failed configuration of that integration process and at least one successful configuration of that integration process, and wherein each of the at least one failed configuration and the at least one successful configuration of each of the plurality of integration processes comprises at least one lineage including a sequence of steps,
        generate a dataset comprising a representation of the lineage of the at least one failed configuration for each of the plurality of integration processes, wherein each of the representations of the lineages is associated with an error resolution comprising a transformation between the at least one failed configuration and the at least one successful configuration for a respective one of the plurality of integration processes, and based on the dataset, build an error resolution model that receives a representation of a lineage as an input and produces a predicted error resolution as an output; and during an operation phase,
generate a graphical user interface comprising one or more inputs for constructing an integration process,
receive a lineage including a sequence of steps from a user via the graphical user interface, and
in response to a trigger, apply the error resolution model to the received lineage to produce the predicted error resolution for the received lineage.

2. The method of claim 1, wherein the predicted error resolution comprises one or more structural changes to the received lineage.

3. The method of claim 2, wherein the one or more structural changes comprise at least one of adding a new step to the sequence of steps in the received lineage, deleting an existing step from the sequence of steps in the received lineage, substituting an existing step in the sequence of steps in the received lineage with a new step, or transposing two existing steps in the sequence of steps in the received lineage.

4. The method of claim 1, wherein generating the dataset comprises flattening each of the plurality of integration processes, comprising multiple paths through the integration process, in the historical integration data, into a plurality of lineages that each consists of a single path through the integration process.

5. The method of claim 4, wherein generating the dataset further comprises, for each of the plurality of integration processes that comprises multiple paths, including a representation of each of the plurality of lineages of the at least one failed configuration that consists of a single path through the integration process in the dataset.

6. The method of claim 5, wherein generating the dataset further comprises, for each of at least a subset of the plurality of integration processes, including a representation of each of one or more lineages of the at least one failed configuration that consist of a sub-path through the integration process in the dataset.

7. The method of claim 1, wherein each of the representations of the lineages comprises a feature vector that includes an entry for each step in the lineage and is annotated with the error resolution.

8. The method of claim 1, wherein the trigger is a user operation.

9. The method of claim 1, wherein the graphical user interface comprises a virtual canvas on which shapes, representing steps, are dragged and dropped to construct the integration process.

10. The method of claim 9, further comprising using the at least one hardware processor to display at least one visual representation of the error resolution within the graphical user interface.

11. The method of claim 10, wherein the at least one visual representation of the error resolution comprises, for each of one or more changes, a dialog that comprises a visual indication of the change, relative to the shapes on the virtual canvas, a first input for applying the change, and a second input for dismissing the change.

12. The method of claim 11, wherein when the change is to add a new step to the sequence of steps in the received lineage, the visual indication of the change comprises a shape representing the new step, and a marker of a position at which to add the new step.

13. The method of claim 11, wherein, when the change is to delete an existing step from the sequence of steps in the received lineage, the visual indication of the change comprises a strikethrough of the shape that represents the existing step.

14. The method of claim 11, wherein, when the change is to substitute an existing step in the sequence of steps in the received lineage with a new step, the visual indication of the change comprises a new shape representing the new step, and a connection between the new shape and the shape that represents the existing step.

15. The method of claim 11, wherein, when the change is to transpose a first existing step and a second existing step in the sequence of steps in the received lineage, the visual indication of the change comprises at least one arrow between the shapes representing the first and second existing steps.

16. The method of claim 1, wherein each of the plurality of integration platforms is managed by a different organizational account than one or more other ones of the plurality of integration platforms.

17. The method of claim 1, further comprising using the at least one hardware processor to, after the building phase and prior to the operation phase, deploy the error prediction model as a microservice within the iPaaS platform.

18. The method of claim 1, further comprising using the at least one hardware processor to, in response to the trigger, further:
generate a prompt using the error resolution;
input the prompt to a generative language model to produce an output; and
display the output in the graphical user interface.

19. A system comprising:
at least one hardware processor; and
software that is configured to, when executed by the at least one hardware processor, during a building phase,
collect historical integration data from a plurality of integration platforms managed through an integration platform as a service (iPaaS) platform, wherein the historical integration data comprise, for each of a plurality of integration processes, a development history of that integration process including at least one failed configuration of that integration process and at least one successful configuration of that integration process, and wherein each of the at least one failed configuration and the at least one successful configuration of each of the plurality of integration processes comprises at least one lineage including a sequence of steps,
generate a dataset comprising a representation of the lineage of the at least one failed configuration for each of the plurality of integration processes, wherein each of the representations of the lineages is associated with an error resolution comprising a transformation between the at least one failed configuration and the at least one successful configuration for a respective one of the plurality of integration processes, and
based on the dataset, build an error resolution model that receives a representation of a lineage as an input and produces a predicted error resolution as an output, and during an operation phase,
generate a graphical user interface comprising one or more inputs for constructing an integration process,
receive a lineage including a sequence of steps from a user via the graphical user interface, and in response to a trigger, apply the error resolution model to the received lineage to produce the predicted error resolution for the received lineage.

20. A non-transitory computer-readable medium having instructions stored therein, wherein the instructions, when executed by a processor, cause the processor to:

during a building phase,
collect historical integration data from a plurality of integration platforms managed through an integration platform as a service (iPaaS) platform, wherein the historical integration data comprise, for each of a plurality of integration processes, a development history of that integration process including at least one failed configuration of that integration process and at least one successful configuration of that integration process, and wherein each of the at least one failed configuration and the at least one successful configuration of each of the plurality of integration processes comprises at least one lineage including a sequence of steps, generate a dataset comprising a representation of the lineage of the at least one failed configuration for each of the plurality of integration processes, wherein each of the representations of the lineages is associated with an error resolution comprising a transformation between the at least one failed configuration and the at least one successful configuration for a respective one of the plurality of integration processes, and based on the dataset, build an error resolution model that receives a representation of a lineage as an input and produces a predicted error resolution as an output; and during an operation phase,
generate a graphical user interface comprising one or more inputs for constructing an integration process, receive a lineage including a sequence of steps from a user via the graphical user interface, and in response to a trigger, apply the error resolution model to the received lineage to produce the predicted error resolution for the received lineage.

* * * * *